US008306348B2

(12) United States Patent
Cohen et al.

(10) Patent No.: US 8,306,348 B2
(45) Date of Patent: Nov. 6, 2012

(54) TECHNIQUES FOR ADJUSTING THE EFFECT OF APPLYING KERNELS TO SIGNALS TO ACHIEVE DESIRED EFFECT ON SIGNAL

(75) Inventors: Noy Cohen, Tel-Aviv (IL); Gal Shabtay, Tel-Aviv (IL); Ephraim Robert Goldenberg, Ashdod (IL); David Mendlovic, Tel-Aviv (IL); Ya'Ara David, Tel-Aviv (IL)

(73) Assignee: DigitalOptics Corporation Europe Limited, Ballybrit, Galway (IE)

( * ) Notice: Subject to any disclaimer, the term of this patent is extended or adjusted under 35 U.S.C. 154(b) by 1256 days.

(21) Appl. No.: 11/970,427

(22) Filed: Jan. 7, 2008

(65) Prior Publication Data

US 2008/0266413 A1 Oct. 30, 2008

Related U.S. Application Data

(60) Provisional application No. 60/933,177, filed on Jun. 4, 2007, provisional application No. 60/926,109, filed on Apr. 24, 2007.

(51) Int. Cl.
*H04N 3/14* (2006.01)
*H04N 5/335* (2011.01)
*G06K 9/40* (2006.01)
(52) U.S. Cl. ............... 382/254; 382/260; 348/222.1
(58) Field of Classification Search .......... 382/254–274, 382/279; 348/606, 607, 624, 614, 700
See application file for complete search history.

(56) References Cited

U.S. PATENT DOCUMENTS 5,764,307 A * 6/1998 Ozcelik et al. ............... 348/608
6,570,616 B1 5/2003 Chen
6,674,486 B2 1/2004 Ueyama
6,823,086 B1 * 11/2004 Dolazza ...................... 382/261
(Continued)

FOREIGN PATENT DOCUMENTS

EP 1 968 009 A2 9/2008
(Continued)

OTHER PUBLICATIONS

Kim et al, Efficient 2-D Convolution Algorithm with the Single-Data Multiple Kernel Approach, Department of Computer Science and Engineering, FR-35, University of Washington, Seattle, Washington 98195 and Department of Electrical Engineering, FT-10, University of Washington, Seattle, 1995.*

(Continued)

*Primary Examiner* — Vu Le
*Assistant Examiner* — Andrae S Allison
(74) *Attorney, Agent, or Firm* — Hickman Palermo Truong Becker Bingham Wong LLP

(57) ABSTRACT

A method and apparatus for adjusting the effect of applying a kernel to a signal is provided. The adjustment may be based on the magnitude of an effect that a kernel matrix is intended to have on the signal matrix. The adjustments can be based on factors including, but not limited to, a signal-to-noise ratio of the signal data, properties of a device (e.g., lens) used to capture the signal data, or a metric that is derived based on an analysis of the signal data. Processing image data in accordance with an embodiment of the present invention is aimed at regaining lost contrast that may be due to properties of optics that are used to capture the image data.

34 Claims, 22 Drawing Sheets

U.S. PATENT DOCUMENTS

| | | | |
|---|---|---|---|
| 6,928,196 B1 * | 8/2005 | Bradley et al. | 382/300 |
| 7,072,525 B1 * | 7/2006 | Covell | 382/261 |
| 7,305,145 B2 * | 12/2007 | Forman et al. | 382/291 |
| 7,633,556 B2 * | 12/2009 | Min | 348/606 |
| 7,965,319 B2 * | 6/2011 | Ozaki | 348/222.1 |
| 2002/0126892 A1 * | 9/2002 | Gindele et al. | 382/166 |
| 2005/0025379 A1 * | 2/2005 | Keshet et al. | 382/260 |
| 2005/0114418 A1 * | 5/2005 | Rosenstengel | 708/315 |
| 2006/0093234 A1 * | 5/2006 | Silverstein | 382/255 |
| 2009/0077359 A1 * | 3/2009 | Chakravarthula et al. | 712/229 |
| 2009/0232401 A1 * | 9/2009 | Yamashita et al. | 382/199 |

FOREIGN PATENT DOCUMENTS

| | | |
|---|---|---|
| JP | 2000-057337 A | 2/2000 |
| JP | 2001-319228 A | 11/2001 |
| JP | 2001-352464 A | 12/2001 |
| JP | 2002-247444 | 8/2002 |
| JP | 2002-247444 A | 8/2002 |
| JP | 2002-325186 A | 8/2002 |
| JP | 2003-150955 | 5/2003 |
| JP | 2003-150955 A | 5/2003 |
| JP | 2003-308528 A | 10/2003 |
| JP | 2005-063022 A | 3/2005 |
| JP | 2005-074080 | 3/2005 |
| JP | 2005-074080 A | 3/2005 |
| JP | 2005-103325 | 4/2005 |
| JP | 2005-103325 A | 4/2005 |
| JP | 2005-142891 | 6/2005 |
| JP | 2005142891 A | 6/2005 |
| JP | 2005-216043 | 8/2005 |
| JP | 2005-216043 A | 8/2005 |
| JP | 2005-354701 | 12/2005 |
| JP | 2005-354701 A | 12/2005 |
| JP | 2006-033760 | 2/2006 |
| JP | 2006-033760 A | 2/2006 |
| JP | 2006-166108 | 6/2006 |
| JP | 2006-166108 A | 6/2006 |
| JP | 2006-187004 | 7/2006 |
| JP | 2006-187004 A | 7/2006 |
| JP | 2006-229383 | 8/2006 |
| JP | 2006-229383 A | 8/2006 |

OTHER PUBLICATIONS

"Invitation to Pay Additional Fees and, Where Applicable, Protest Fee" received in International application No. PCT/EP2008/003278 dated Apr. 15, 2009 (6 pages).

Current Claims of International application No. PCT/EP2008/003278 (Apr. 2009) 7 pages.

European Patent Office, "Notification of Transmittal of the International Search Report and the Written Opinion of the International Searching Authority, or the Declaration" received in International application No. PCT/EP2008/003278 dated Jul. 22, 2009 (15 pages).

Current Claims of PCT/EP2008/003278 dated Jul. 2009 (7 pages).

Castro-Pereja, C. et al., "FPGA-based Real-time Anisotropic Diffusion Filtering of 3D Ultrasound Images", 2005 *SPIE*, 10 pages.

Kim, J., "Efficient 2-D Convolution Algorithm with the Single-Data Multiple Kernel Approach" *Academic Press, Inc.* 1995, 8 pages.

Kwan H. et al., "Design of Multidimensional Spherically Symmetric and Constant Group Delay Recursive Digital Filters with Sum of Powers-of-Two Coefficients" 1990 *IEEE*, XP-002635471, 10 pages.

Lee, V. et al., "GA-based Design of Multiplierless 2-D State-Space Digital Filters With Low Roundoff Noise" *IEE Proc.—Circuits Devices System* Apr. 1998, 8 pages.

Porikli, F., "Reshuffling: A Fast Algorithm for Filtering with Arbitrary Kernels" *SPIE* 2008, XP-002524200 (10 pages).

The State Intellectual Property of the People's Republic of China, Office Action for Foreign Patent Application No. 200880013422.5, Applicant: Tessera Technologies Ireland Limted, dated May 6, 2011, 9 pages.

Current claims in for Foreign Patent Application No. 200880013422.5., Applicant: Tessera Technologies Ireland Limted, dated May 2011, 7 pages.

Japanese Patent Office, JP Office Action received in International Application No. 504532/2010 dated Dec. 6, 2011, 4 pages.

English Translation of JP Office Action in International Application No. 504532/2010 dated Dec. 6, 2011, 5 pages.

Current Claims, Application No. 504532/2010, dated Dec. 2011, 5 pages.

Communication from European application No. 08735375.1 dated Apr. 28, 2010 (6 pages).

Current claims from European application No. 08735375.1 dated Apr. 2010 (3 pages).

China Patent Office, CN Office Action received in International Application No. 200880013422.5 dated Jan. 12, 2012 (7 pages).

Current Claims, Application No. 200880013422.5 (7 pages), dated Jan. 2012.

Japan Patent Office, "Office Action in application No. 2010-504532", dated Aug. 21, 2012, 4 pages.

Current claims in application No. 2010-504532, dated 2012, 10 pages.

* cited by examiner

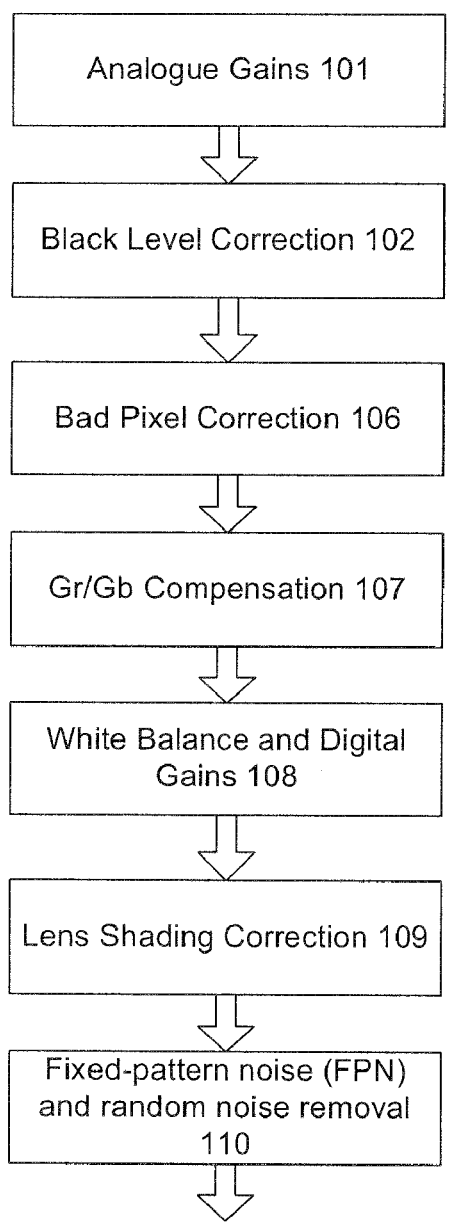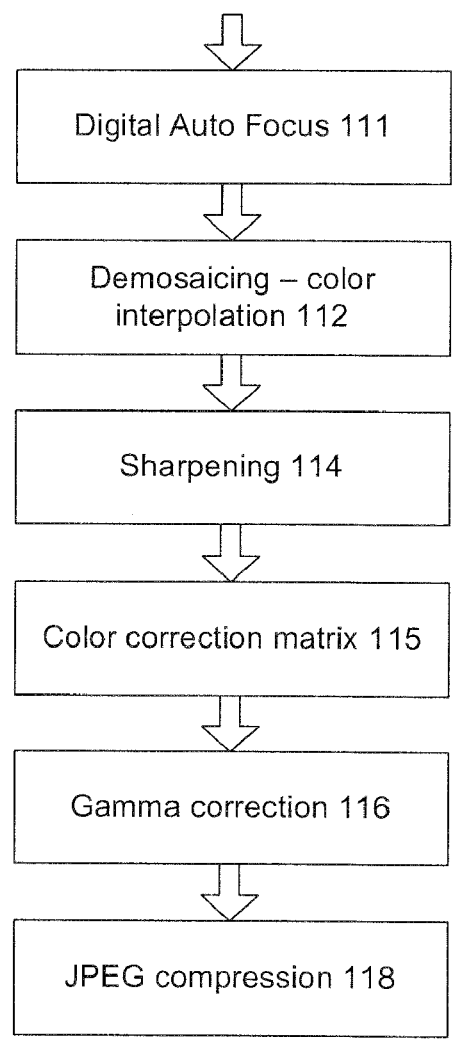
FIG 1b $$\underbrace{\begin{bmatrix} \alpha A & \alpha B & \alpha C \\ \alpha D & \alpha E+(1-\alpha) & \alpha F \\ \alpha G & \alpha H & \alpha I \end{bmatrix}}_{Final\_Kernal(alpha-updatedkernel)} = \alpha \cdot \underbrace{\begin{bmatrix} A & B & C \\ D & E & F \\ G & H & I \end{bmatrix}}_{Initial\_Kernel} + (1-\alpha) \cdot \underbrace{\begin{bmatrix} 0 & 0 & 0 \\ 0 & 1 & 0 \\ 0 & 0 & 0 \end{bmatrix}}_{Delta\_Kernel}$$

| G | R | G | R | G | R | G | R | G | R |
|---|---|---|---|---|---|---|---|---|---|
| B | G | B | G | B | G | B | G | B | |
| G | R | G | R | G | R | G | R | G | R |
| B | G | B | G | B | G | B | G | B | |
| G | R | G | R | G<br>*801g* | R<br>*801r* | G | R | G | R |
| B | G | B | G | B<br>*801b* | G | B | G | B | |
| G | R | G | R | G | R | G | R | G | R |
| B | G | B | G | B | G | B | G | B | |
| G | R | G | R | G | R | G | R | G | R |
| B | | B | | B | | B | | B | |

*FIG. 8*

$$\underbrace{\begin{bmatrix} A' & B' & C' \\ D' & E' & F' \\ G' & H' & I' \end{bmatrix}}_{\text{Final\_Kernel(update\_kernel)}} = \frac{(win\_std - Min\_std\_val)}{dyn\_range} \cdot \underbrace{\begin{bmatrix} A & B & C \\ D & E & F \\ G & H & I \end{bmatrix}}_{\text{input\_Kernel}} + \frac{Max\_std\_val - win\_std}{dyn\_range} \cdot \underbrace{\begin{bmatrix} 0 & 0 & 0 \\ 0 & 1 & 0 \\ 0 & 0 & 0 \end{bmatrix}}_{\text{Delta\_Kernel}}$$

*FIG. 11*

| 10 | 0 | 99 | 0 | 304 | 0 | 175 | 0 | 228 |
|---|---|---|---|---|---|---|---|---|
| 0 | 363 | 0 | 357 | 0 | 419 | 0 | 291 | 0 |
| 349 | 0 | 349 | 0 | 254 | 0 | 223 | 0 | 356 |
| 0 | 220 | 0 | 104 | 0 | 338 | 0 | 190 | 0 |
| 194 | 0 | 155 | 0 | 461 | 0 | 372 | 0 | 318 |
| 0 | 168 | 0 | 440 | 0 | 176 | 0 | 360 | 0 |
| 436 | 0 | 277 | 0 | 421 | 0 | 165 | 0 | 407 |
| 0 | 97 | 0 | 437 | 0 | 148 | 0 | 280 | 0 |
| 257 | 0 | 77 | 0 | 330 | 0 | 429 | 0 | 490 |

*FIG. 9A*

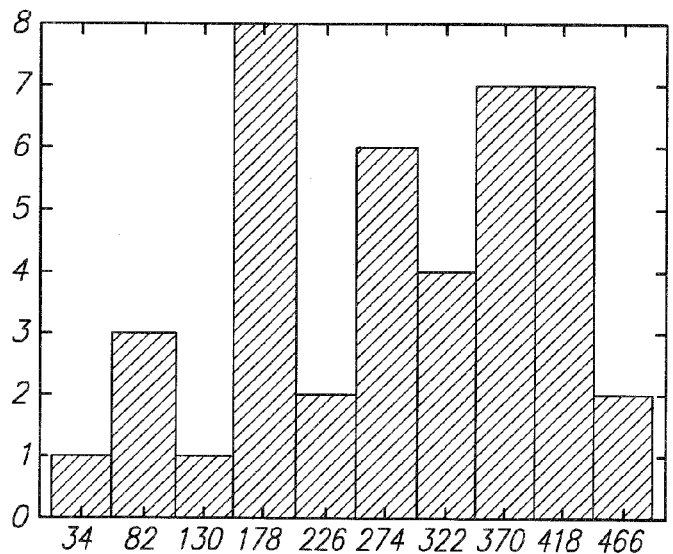

*FIG. 9B*

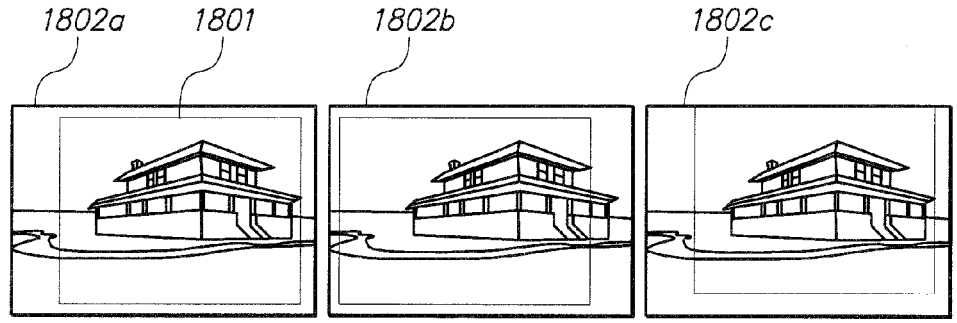
The red frame is the viewed image — due to camera shakes the image on the screen is shaky — consecutive frames are spatially shifted one compared to the other.
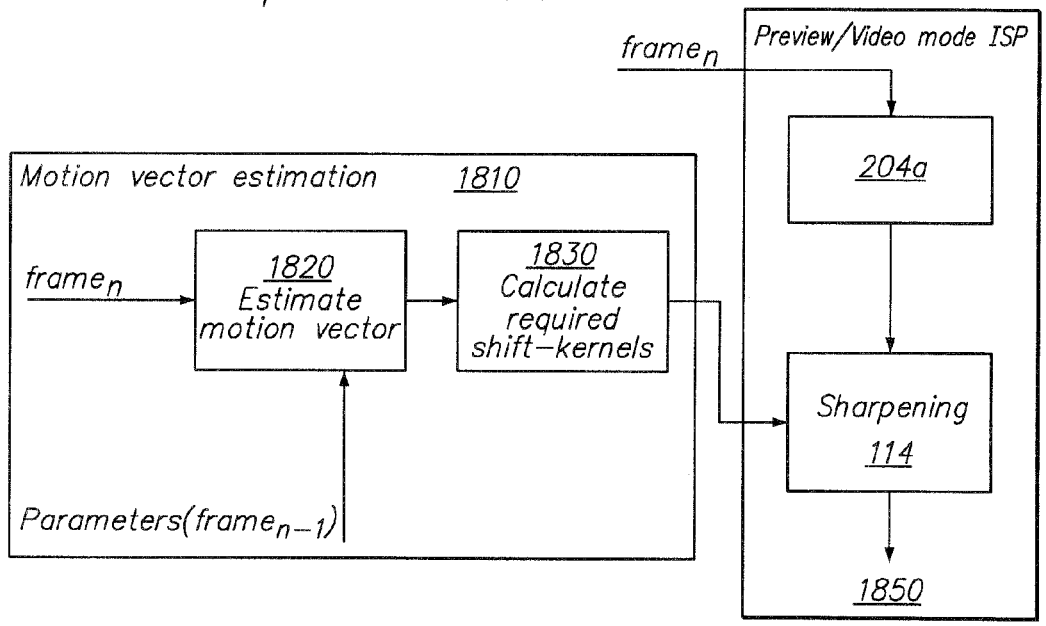
FIG. 18

TECHNIQUES FOR ADJUSTING THE EFFECT OF APPLYING KERNELS TO SIGNALS TO ACHIEVE DESIRED EFFECT ON SIGNAL

PRIORITY CLAIMS

This application claims benefit of Provisional Application No. 60/926,109, filed Apr. 24, 2007, the entire contents of which is hereby incorporated by reference as if fully set forth herein, under 35 U.S.C. §119(e).

This application claims benefit of Provisional Application No. 60/933,177, filed Jun. 4, 2007, the entire contents of which is hereby incorporated by reference as if fully set forth herein, under 35 U.S.C. §119(e).

FIELD OF THE INVENTION

The present invention relates to digital signal processing. In particular, embodiments of the present invention relate to modifying the effect that is achieved when applying a kernel matrix to process signal data so that a desired effect is achieved.

BACKGROUND

In digital imaging, de-convolution is sometimes used to create better images by correcting optical aberrations, such as optical blurring, optical distortion, chromatic aberration, field curvature, etc., that take place in an imaging instrument, such as a digital camera. The mathematical operation that defines de-convolution is the same mathematical operation that is performed in convolution—the reason for naming it de-convolution is that it is used in a context of correcting or compensating for an effect that is applied on the image by convolution. In other words, the use of de-convolution—in this manner—is based on the fact that when an image signal passes through an imaging instrument, it is possible to describe the output signal as a convolution between the image signal and a 2D function called a point spread function (PSF). Using optical blurring as an example, the PSF describes the optical blurring in terms of the pathway a point source of electromagnetic radiation takes through the instrument, i.e., how a single point of light is imaged through the optical system. The result of the PSF convolution is that the captured image signal is more blurred than the object itself (and can also be distorted, and/or contain color aberrations). In order to compensate for this blurring, a de-convolution process can be performed, in which the image signal is convolved with a 2D function that is aimed to produce a non-blurred image. This 2D function is often an inverse of the PSF (or a variation of the inverse of the PSF) in a way that it undoes the blurring the PSF introduces.

A 2D de-convolution can be performed in the digital domain, on a digital representation of an image, in software (SW) or hardware (HW). A kernel matrix is usually used as the 2D de-convolution filter, which can be characterized by a desired frequency response. The kernel matrix is convolved with a signal matrix (the 2D image) in order to compensate for the PSF blur and enhance the contrast in the image. In order for the filter to enhance contrast, it should have a frequency response of a band-pass filter (BPF) or high-pass filter (HPF), such that it matches the PSF in a way that the contrast in required frequencies is enhanced to a specified level.

In addition to enhancing the contrast in the image, the same convolution operation can be used to reduce noise in the image, by applying kernels with low-pass frequency response (LPF) on it, averaging the noise. Care should be taken not to damage the signal's contrast when performing such a de-noising operation.

Usually, the de-convolution process that enhances the image is a part of an image signal processing (ISP) chain that is run in the digital camera (in SW or HW). This chain of mathematical operations on the image transforms it from a "RAW" format image (sometimes referred to as a "NEF" image) that the CMOS/CCD sensor outputs (in e.g., "BAYER" format), to a final image (e.g., a JPEG image, a TIFF image, etc.) that is viewed and saved. Within the ISP chain, applying the de-convolution filters on the image may be done after performing de-mosaicing (color interpolation), or before de-mosaicing. The former method enables the filter to affect the maximum possible frequencies in the image (pixel-by-pixel); however, in order to cover a large spatial support, the 2D kernel should have many coefficients. The latter method implies applying the filter while the image is still in BAYER format (before color interpolation). The latter method has the advantage of covering a larger spatial support for fewer coefficients, but the filters can only affect lower frequencies. Since for most optical designs, the size of the kernel should be about the same as the size of the PSF (in pixels) in order for the de-convolution to be effective, compensating for large PSFs requires large enough spatial support for the de-convolution kernels, and thus many coefficients (which implies more memory and mathematical calculations). This might be a prime reason for applying the de-convolution kernels on the BAYER image before the demosaicing process, because if too small kernels are applied on an image that is blurred by a large PSF, then undesired artifacts may remain after the processing.

While applying a de-convolution filter with a HPF/BPF frequency response on an image might result in increased contrast, it may also undesirably amplify noise. This noise amplification is less noticeable when the signal-to-noise ratio (S/N) is good, and is most noticeable in bad light conditions, which can cause low S/N. Unfortunately, applying de-convolution kernels without regarding the amount of noise already in the image may lead to noisier images.

A denoising algorithm might be applied to reduce the unwanted noise amplification that results from applying de-convolution kernels. However, applying denoising algorithms after the de-convolution process has already amplified the noise in the image could require performing strong de-noising, which may cause unwanted loss of data in areas with fine-details in the image. Moreover, applying strong denoising still will not remove all of the noise.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1b depicts an ISP chain with a possible location for a digital-auto-focus block, in accordance with an embodiment;

FIG. 3 shows an example equation for updating the kernels, in accordance with an embodiment;

FIG. 8 shows an example bayer image having red (R), blue (B) and green (G) pixels;

FIG. 9A illustrates data for an image window;

FIG. 9B illustrates the histogram for the data in FIG. 9A;

FIG. 11 depicts an equation for updating a kernel based on a metric, in accordance with an embodiment;

FIG. 18 depicts correcting motion shift, in accordance with an embodiment;

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Figures 5, 6:
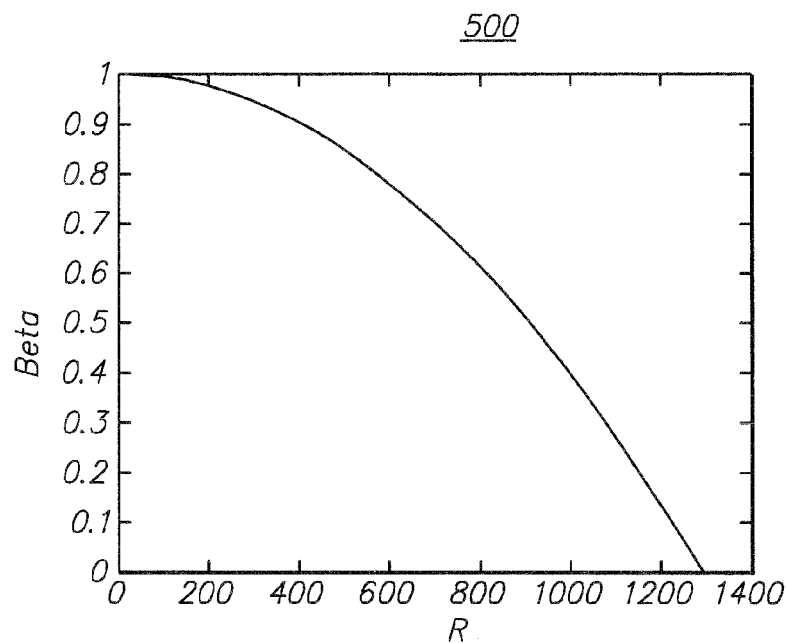
FIG. 5 depicts a graph of an example lens shading profile.
FIG. 6 depicts an equation for updating a kernel based on a shading parameter, in accordance with an embodiment.

Embodiments are described herein according to the following outline:
  1.0 Overview
  2.0 Example Image Signal Processing Chain
  3.0 Overview Of Convolution
  4.0 Overview Of Adjusting Kernel Effect Based On Magnitude Of Intended Effect
    4.1 Process Overview
    4.2 Overview Of Adjusting Kernel Effect By Updating Kernels
    4.3 Overview Of Adjusting Kernel Effect By Modifying Convolution Result
  5.0 Adjusting Kernel Effect Based On Various Factors
    5.1 Adjusting Kernel Effect Based On S/N Figure.
    5.2 Adjusting Kernel Effect According To Spatial Location
    5.3 Adjusting Kernel Effect According To Local Image Characteristics
  6.0 Adjusting Kernel Effect To Treat Motion Blur In Accordance With An Embodiment
    6.1 Overview Of Correcting Motion Blur
    6.2 Blurry Point Spread Function Embodiment
    6.3 Motion Shift Vector Embodiment
    6.4 Combining The Sharpening And Motion Blur Kernels
  7.0 Hardware Overview
    7.1 Example Mobile Device
    7.2 Example Computer System 1.0 Overview Techniques are disclosed herein for processing signal data. The signal data may be represented by a number of different signal matrices, with each matrix representing a different portion of the signal. For example, each signal matrix could contain entries that correspond to a set of pixels in an image sensor. However, the signal could be, for example, audio data or other signal data, rather than image data. A given signal matrix is processed based on at least one kernel matrix to achieve some intended effect. More particularly, the magnitude of the intended effect that is achieved due to processing the signal matrix based on the kernel matrix is adjusted in order to achieve the magnitude of the intended effect.

In an embodiment, a kernel matrix that is applied to signal data is modified one or more times according to one or more parameters that will be stated in subsequent sections, prior to applying the modified kernel matrix to the signal data. Modifying the kernel matrix according to the one or more parameters allows the magnitude of the intended effect to be achieved. In another embodiment, the final processing result for a certain pixel may be a weighted sum of a de-convolution result using unmodified kernels and some other values (one or more), including, but not limited to the original pixel value in the input image. The weight of each of the summed values can be modified according to several parameters that will be stated in the subsequent sections. The modifications can be based on factors including, but not limited to, a signal-to-noise ratio of the signal data, properties of a device (e.g., lens) used to capture the signal data, spatial-dependent information (e.g., pixel location), or a metric that is derived based on an analysis of the signal data (e.g., pixels in the neighborhood of the pixel currently being processed).

Processing image data in accordance with a "sharpening" embodiment of the present invention is aimed at regaining lost contrast. Contrast may be lost, for example, due to properties of optics that are used to capture the image data. However, the sharpening embodiment does not require the use of any particular lens. A purpose of the sharpening embodiment is to restore some of the image's contrast that is lost due to optical properties of the lens, so that the final image has good contrast, both for images of far objects and of close-by objects, while paying reasonable S/N penalty. The sharpening embodiment can be implemented as an image signal processing (ISP) block in hardware, software, or some combination of hardware and software.

In an embodiment, kernels that are used have a high-pass or band-pass frequency response, which allows the kernels to sharpen the image by enhancing differences in the image. Examples of the differences include edges between dark and bright areas, shapes, contours, etc. However, applying these kernels over a relatively uniform surface in the image (such as a gray wall or blue sky, for example) may cause amplification of small differences that exist between the pixels. These small differences between the pixels may be caused by noise (either random noise or fixed-pattern noise). Therefore, applying the kernels may lead to undesired noise amplification in "flat," uniform, informationless areas in the image. The undesired noise may be particularly severe in low-light conditions. Several techniques are disclosed herein that avoid amplifying noise in "flat" areas in the image, while preserving the contrast in desired areas.

The gain of each of the kernels (e.g., the amount of sharpening they provide) is adjusted according to a S/N figure, in an embodiment. Thus, the kernels' gains could be lowered when processing an image, or portion thereof, that has a poor S/N. As a particular example, the kernels' gains could be lowered when processing an image that was captured in very low light. In one embodiment, the gain of the kernel is adjusted by modifying the kernel based on a S/N parameter, and then applying the modified kernel to the image. In another embodiment, scaling is performed based on the S/N parameter after applying un-modified kernels to the image.

In one embodiment, the kernels' gains are adjusted based on spatial location of the current portion of the image being processed. In one embodiment, spatial location dependant adjusting compensates for properties of a lens used to capture the image data. Both auto focus and standard lenses may suffer from a radially degrading illumination profile. That is, the amount of light that comes through the lens is significantly lower in high fields than in the middle of the lens. Therefore, the S/N may be lower at the image borders as compared to the center. In some designs, the illumination in the borders is about 50-55% of its value in the middle field. However, the illumination in the borders could be greater or less than 50-55%. In one embodiment, the gain of the kernel is adjusted by modifying the kernel based on a shading parameter, and then applying the modified kernel to the image. In another embodiment, scaling is performed based on the shading parameter after applying un-modified kernels to the image. Consequently, better S/N in image borders and a better looking image is achieved, in accordance with an embodiment of the present invention.

In one embodiment, the effect of applying the kernels is modified based on a metric that describes some characteristic of the image in the neighborhood of the current pixel being processed. The metric is based on a statistical analysis of the pixels in the neighborhood of the current pixel, in an embodiment. For example, the statistical analysis could be based on a standard deviation between entries in a matrix of image data, a histogram of the entries in the image matrix, or entropy in the entries in the image matrix. However, the metric can also be based on a calculation of gradients between certain pixels in the neighborhood of the current pixel. In one embodiment, kernels are modified based on the metric. The modified kernels are then applied to the image data. In another embodiment, scaling is performed based on the metric after applying unmodified kernels to the image.

In some applications, kernels may be intended to counteract a PSF. That is, the kernels could be intended to be the inverse of a PSF that represents an optical aberration, such as blurring, in the device that captures the signal. However, it is not required that the kernels be the inverse of a PSF. Furthermore, there are examples herein in which the kernels are used to enhance image contrast. However, it is not required that the techniques described herein be applied to kernels used to enhance image contrast. Moreover, there are examples herein in which the kernels are used for image processing. However, more generally, the techniques described herein can be applied to kernels that are used for any digital signal processing application.

In one embodiment, the same mechanism that is used to sharpen an image (contrast enhancement) is also used for reducing or eliminating effects of motion-blur or shake in images. Using the same mechanism for motion blur correction and contrast enhancement may result in a better solution in terms of silicon size, processor cycles, complexity, and cost.

2.0 Example Image Signal Processing Chain

Figure 1A:
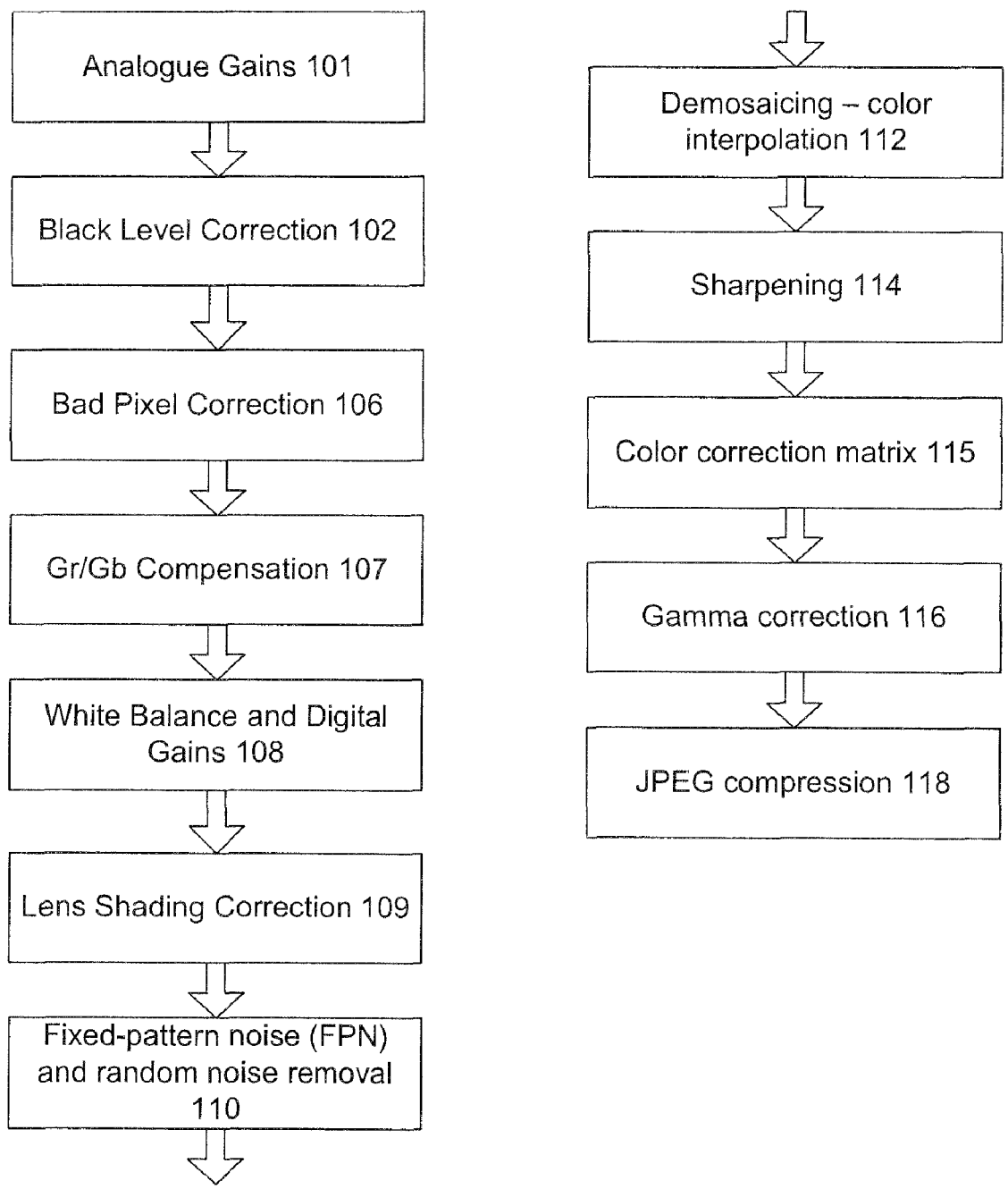
FIG. 1a depicts an ISP chain without a digital-auto-focus block.

In digital still camera modules, the set of algorithms that process a raw image, and output a final image (e.g., JPEG image, TIFF image, etc.) that is saved in a non-volatile memory is called Image Signal Processing chain, or ISP chain. FIG. 1a depicts typical stages that are present in an ISP chain 100. An ISP chain could have other stages and is not required to have all of the stages that are depicted in FIG. 1a. The stages could be in different order.

In one embodiment, digital auto-focus is implemented as a standalone block that serves as a part of an ISP chain. The example ISP chain 100 shows a typical ISP chain without the digital-auto-focus block. The example ISP chain 100 contains the following stages. The analog gain 101 applies gain before A/D conversion to compensate for dark image (e.g., while using low exposure time). The black level correction 102 removes a floor value from the image (i.e., "dark current" that is output from the sensor). The bad pixel correction 106 locates "burned" pixels that produce false very low or very high values in the image and replaces them with a "smart" average of the environment. The Gr/Gb compensation 107 compensates, in CMOS sensors that have a BAYER pattern, for differences that might occur between green pixels values in lines with blue pixels and green pixels values in lines with red pixels. It is not required that the image sensor use a BAYER format. The white balance and digital gain 108 applies gains on each color (Green-Red, Red, Green-Blue, Blue) in order to balance the colors and compensate for lighting conditions and light levels, while maintaining dynamic range.

The lens shading correction 109 compensates for the lens shading profile by increasing the luminance of far-from-the-center pixels. The noise removal 110 removes random noise and fixed-pattern noise from the image. The color interpolation (demosaicing) 112 interpolates the BAYER image to a complete RGB image, in which every pixel has three color channel values.

The sharpening 114 enhances the contrast in the image. As shall be described in greater detail hereafter, a digital auto focus block differs from the sharpening block in that digital auto focus compensates for a PSF.

The color correction matrix 115 is in charge of the color accuracy and color saturation of the image. The gamma correction 116 applies a gamma curve to the image. The JPEG compression 118 compresses the image from a full BMP image to a JPEG image that can then be saved to a non-volatile memory (such as flash memory). Compression other than JPEG could be used.

Figure 1C:
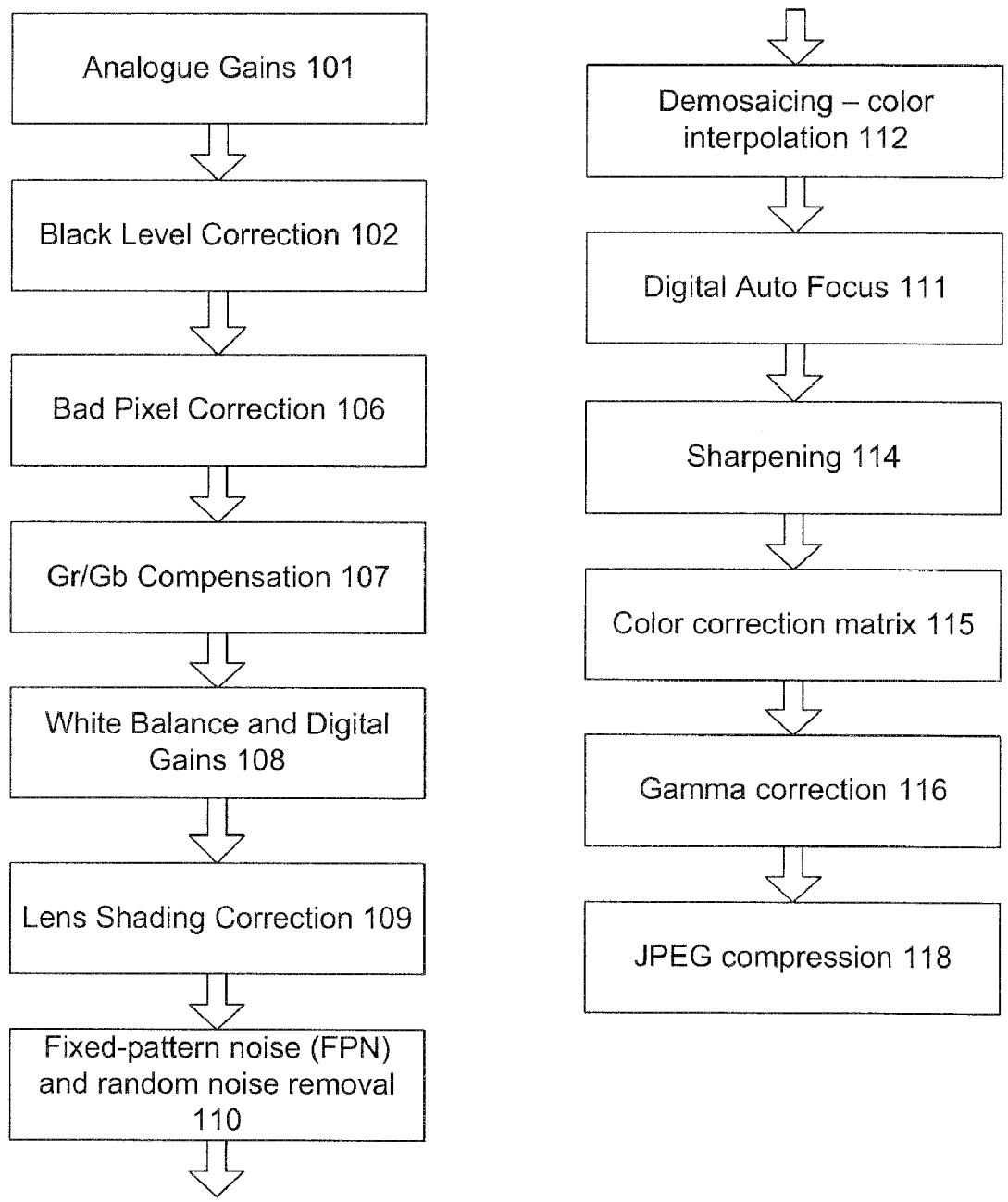
FIG. 1c depicts an ISP chain with another possible location for a digital-auto-focus block, in accordance with an embodiment.

There are many possible locations in the ISP chain for a digital-auto-focus block. FIG. 1b depicts ISP chain 100a that incorporates a digital auto focus block 111, in accordance with an embodiment. In ISP chain 100a for example, digital auto focus block 111 is located just before demosaicing block 112, i.e. it is applied on a BAYER image. FIG. 1c depicts ISP chain 100b that also incorporates a digital auto focus block 111, in accordance with an embodiment. In ISP chain 100b, digital auto focus block 111 is located after demosaicing block 112, i.e. it is applied on a RGB image. In both cases of ISP 100a and ISP 100b, it is not required that digital auto focus block is located exactly where depicted—it can be located elsewhere in the ISP as well. In an embodiment, the digital auto focus 111 block comes after bad pixel correction 106, because digital auto focus 111 may enhance bad pixels effect. In a further embodiment, it is recommended digital auto focus block comes after bayer de-noising 110 block, lens shading correction 109 block white balance 108 block, Gr/Gb compensation 107 block, bad pixels correction 106 block, and black level correction 102 block, since these blocks correct for sensor and partly lens faults. Note that incorporating the digital auto focus block into the ISP may result in the sharpening 114 block becoming unnecessary.

The ISP chain 100 as a whole is capable of good quality images for low resolution screens, even without applying the digital auto focus 111 stage. Thus, it is not required to activate digital auto focus 111 in preview mode (when the images are shown on the preview screen of the handset before capturing an image).

In an embodiment of the algorithm, the camera module system that captured the image contains a macro/normal feature that enables the user to choose whether to take a close-object image (e.g., 20-40 cm) or to capture a distant-object image (e.g., 40 cm-infinity). The selection of the mode is input into the digital auto focus 111, in one embodiment, and may be used to change the processing. For example, different de-convolution kernels could be used, or the kernels could be altered, depending on the shooting mode. Other parameters from other stages in the ISP chain 100 can also be input to the digital auto focus stage 111. As one example, another stage provides the digital auto focus stage 111 with a S/N figure pertaining to the image. The digital auto focus stage 111 adjusts the amount of sharpening based on the S/N figure. In one embodiment, the amount of sharpening is based on pixel location, which may be provided by another stage in the ISP chain 100. However, it is not required that a normal/macro mode will be used to choose between different kernels—a single set of kernels may support both far and near distances.

3.0 Overview of De-Convolution

In one embodiment, the kernels are used to perform bayer de-convolution. However, de-convolution is merely one example of how the kernels may be used. A bayer image can be modeled as a 2D matrix of pixel values, such that every cell value has its own color—red, green or blue, according to the color filter above the sensor's pixel it represents. FIG. 8 shows an example bayer image 800 having red (R), blue (B) and green (G) pixels. The locations of the pixels represent the pixel positions in the image data that are convolved with the kernel for that color. Each of the colors has a center pixel 801g, 801r, 801b, which identifies the pixel in the image signal whose value is modified by convolving the appropriate color kernel matrix with the corresponding pixels in the image signal.

BAYER convolution, in accordance with an embodiment, uses three 2D kernels—one for each pixel color—that define the pixels that take part in the convolution and the coefficients values that multiply each pixel. The kernels sizes can be defined in terms of support, which refers to how many pixels in the signal image the will kernels "cover" when they are placed upon an image. Referring to FIG. 8, the kernels support size is 9×9. The kernels could support many other sizes. In another embodiment, the green pixels are divided into green pixels located in a row with blue pixels ($G_b$) and green pixels located in a row with red pixels ($G_r$). In such an embodiment, there a two green kernels, one for $G_b$ and another for $G_r$, with a similar construct to the red or blue pixels kernels Note that the convolution does not mix different colors, in some embodiments. That is, each center pixel is convolved with surrounding pixels of the same color alone, in some embodiments. However, in other embodiments, convolution does mix colors. For example, when processing a red center pixel, information from blue and/or green pixels could be used in the de-convolution. Thus, a kernel matrix for a given color can have non-zero coefficients at locations that correspond to pixels of a different color.

The kernel's coefficients are multiplied by the corresponding pixels in the captured image, they are all summed, and the result is written to the proper place in the output image. Those corresponding pixels in the image are referring to herein as "the current image window." For example, the kernels in FIG. 8 support a 9×9 pixels environment. In FIG. 8, the red pixels and blue pixels each form a 5×5 matrix. The red pixels in the captured image around the center red pixel 801r are the current image window, when processing the center red pixel 801r. Thus, the current image window includes only pixels of a single color, in this example. However, for some types of processing, the current image window might have pixels of more than one color—for example, if the kernels mix colors—i.e. contain coefficient that multiply different color pixels than the center pixel the processing is performed for—the image window they operate must also include these pixels. Note that the green pixels have a 5×5 pattern and a 4×4 pattern for a total of 41 pixels. The center pixel of each pattern is the pixel whose value is updated by the convolution. In this example, bayer convolution is used, in which for each color only the same-color pixels are used. Thus, the red pattern is used to update the red center pixel 801r, based on the red center pixel and the neighboring red pixels in the pattern.

Table I depicts coefficients for an example bayer filter of a 3×3-support kernel for convolving green pixels. When the center coefficient of the kernel falls on a green pixel, only green pixels are taking part in the convolution. Note that it is not necessary to actually perform multiplication for kernel coefficients having a value of zero.

TABLE I

| | | |
|---|---|---|
| −0.5 | 0 | −0.5 |
| 0 | 3 | 0 |
| −0.5 | 0 | −0.5 |

As an example, if the above bayer filter were to be applied to the appropriate portion of FIG. 8, then the green center pixel 801g and the four nearest green pixels take part in the convolution. The convolution may act as a high pass filter, or band pass filter. However, the convolution might also act as a low pass filter, or another function.

Note that the sum of the kernel coefficients in Table I is equal to 1. If the coefficients summed to a value other than 1, the kernel would affect the "DC" value of the image (e.g. when all the pixels taking part are of the same value), which could affect the color or intensity. When applying the kernel to a uniform-color surface, it may be desirable to preserve that color (or intensity).

When an RGB de-convolution is used (i.e. the de-convolution is performed after a demosaicing process), all pixels have 3 values (R, G, B) each, and thus the kernel for each color can be written as a 2D matrix with valid coefficients for each matrix cell—since the information in the image for each color is spatially continuous and exists in every pixel. It is convenient to view an RGB image as combined of 3 2D matrices—one for the red color, one for the green and the last for the blue. In case where no color-mixing is performed, each kernel is applied on the 2D matrix containing the color that fits that kernel. However, in an embodiment, the kernels may mix colors, and thus kernels may have values that multiply pixels in all 3 R, G and B image matrices.

In one embodiment, a check is made to ensure that there is no overflow or underflow with respect to the bit resolution of the output image. If there is, then saturation and clipping may be used. The bit resolution of the output image is the same as the input image, in an embodiment. However, this is not required. In another embodiment, the output image resolution might change with respect to the input image resolution. The order in which the pixels are processed is not limited to any particular order. The order may depend on the input interface to the sharpening stage 114.

4.0 Overview of Adjusting Kernel Effect Based on Magnitude of Intended Effect

4.1 Process Overview

Figure 12:
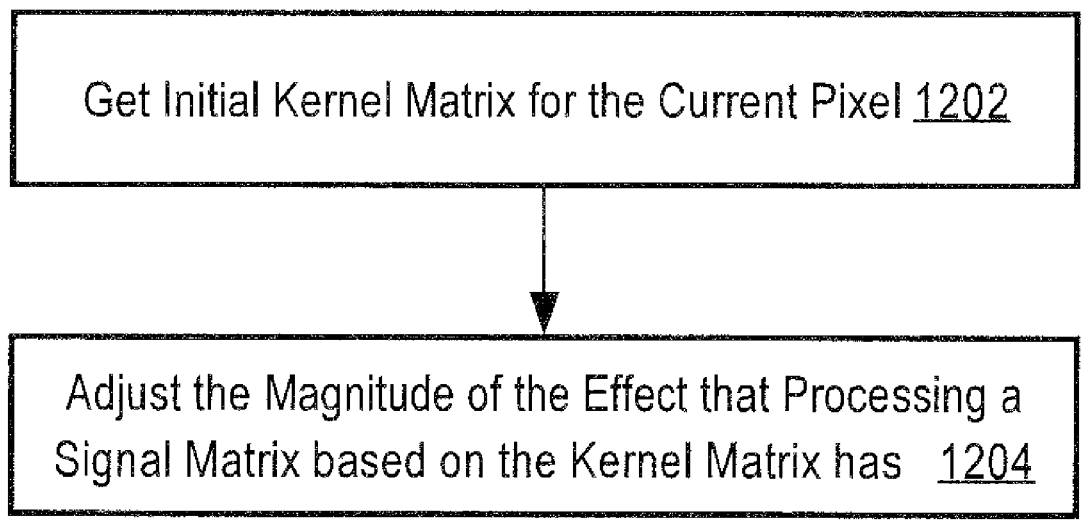
FIG. 12 is a flowchart illustrating a process for adjusting the magnitude of a kernel effect, in accordance with an embodiment.
Figure 21:
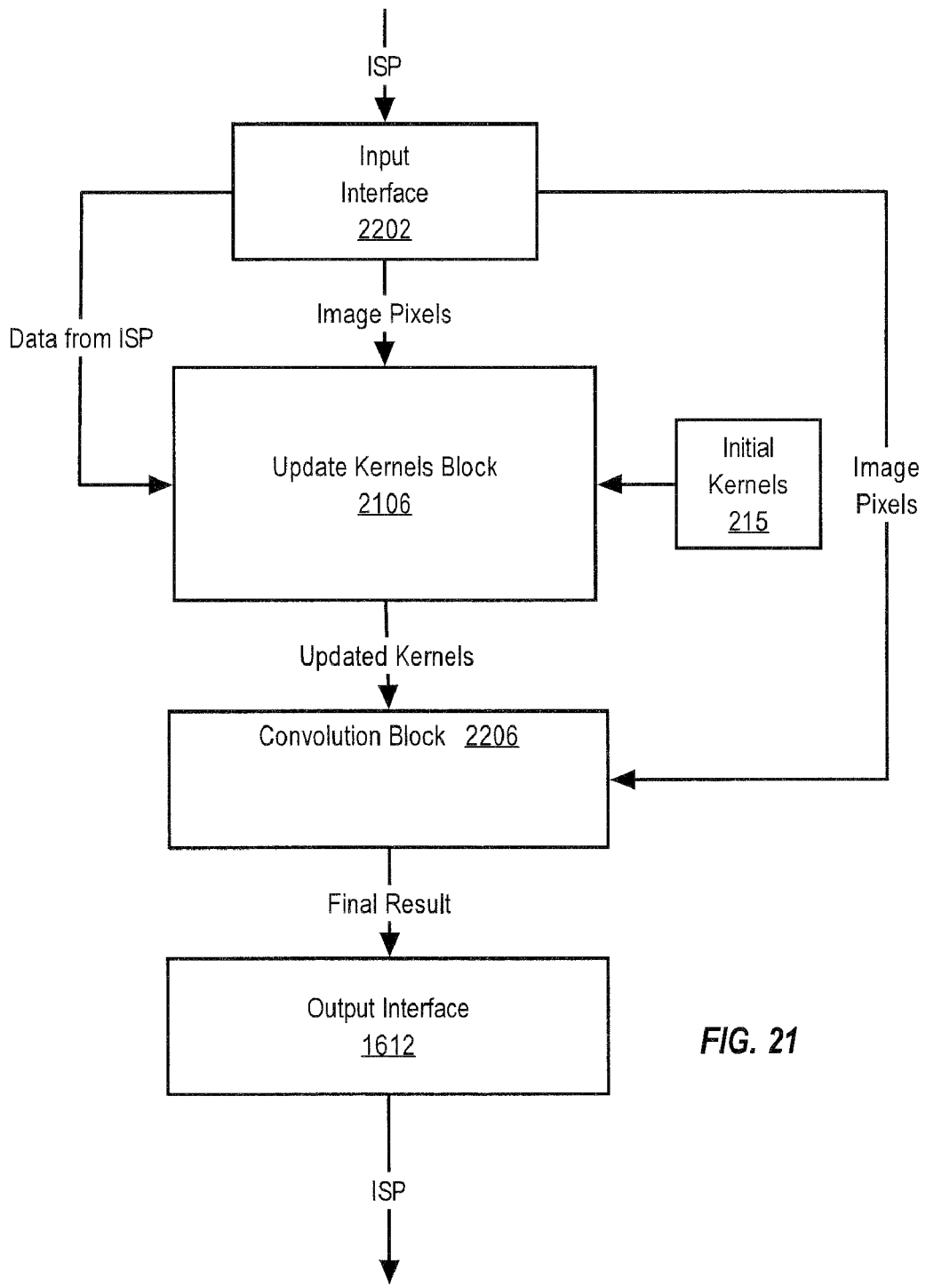
FIG. 21 depicts a technique in which a kernel is updated based on one or more parameters, in accordance with an embodiment.
Figure 22:
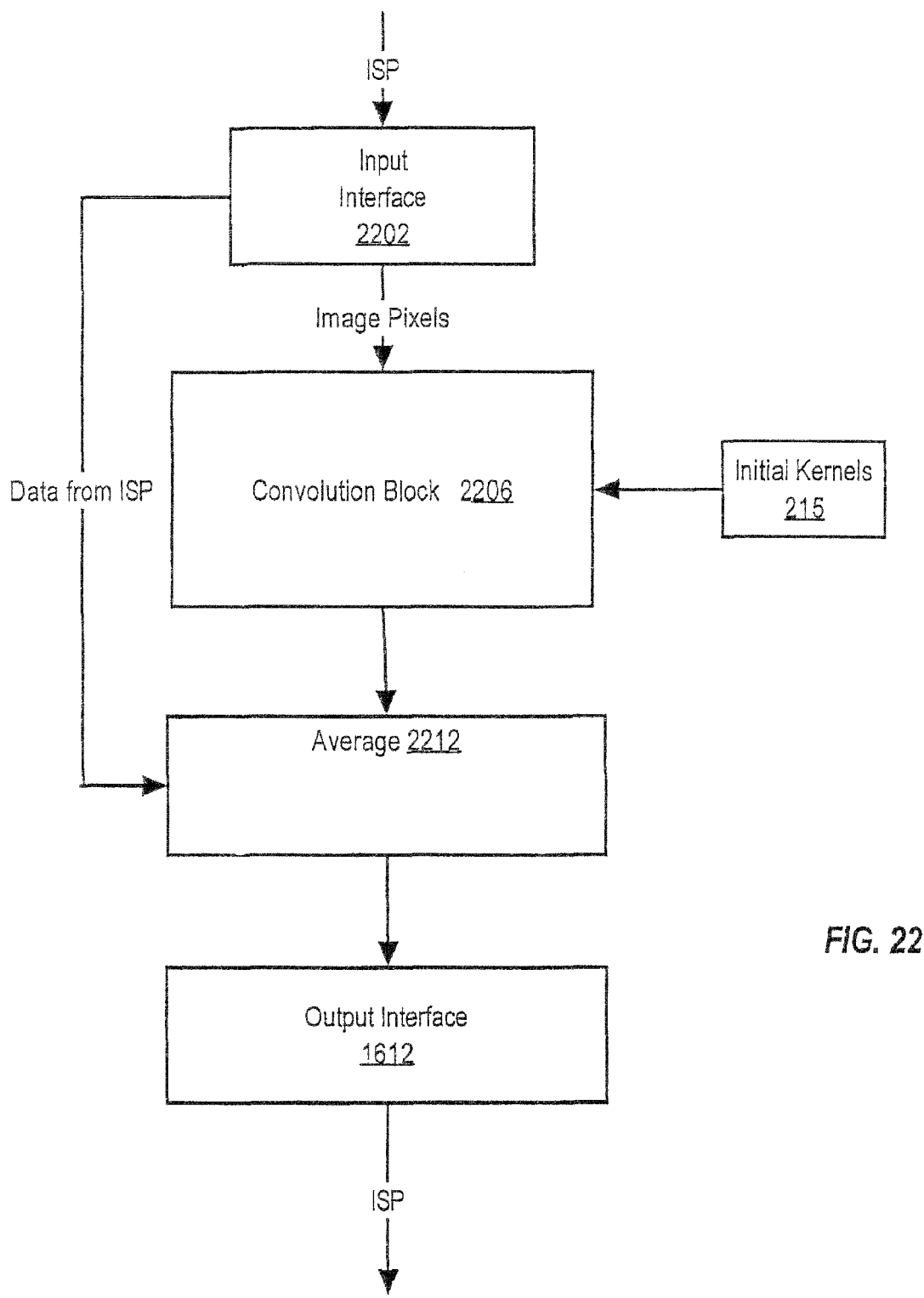
FIG. 22 depicts a technique in which "scaling" is applied to the convolution result of unmodified kernels, in accordance with an embodiment.

FIG. 12 is a flowchart illustrating a process 1200 for adjusting kernel effect, in accordance with an embodiment. In step 1202, an initial kernel matrix is accessed. In step 1204, an adjustment is made to the effect that processing the kernel matrix has on a signal matrix. The adjustment is designed to modify the magnitude of the effect that the kernel has on a signal. FIG. 21 and FIG. 22 depict two techniques for adjusting the effect that processing the kernel matrix has on a signal matrix.

The intended effect might be to enhance image contrast, although it could be another effect. The adjustment to the magnitude of the effect could be based on a S/N figure of the signal. The adjustment to the magnitude of the effect could be based on the location of the pixel. The adjustment to the magnitude of the effect could be based on properties of a lens that is used to capture the signal (e.g., lens shading). The adjustment to the magnitude of the effect could be based on characteristics of data in the neighborhood of the data being processed. As an example, the characteristics might be statistical in nature, such as a standard deviation of the data. The kernel effect may be adjusted by any number of these factors, or by other factors.

4.2 Overview of Adjusting Kernel Effect by Updating Kernels

FIG. 21 depicts a technique in which a kernel is updated based on one or more parameters, in accordance with an embodiment. Then, the updated kernel is used for convolution. In FIG. 21, the input interface 2202 receives an image signal from another stage in the ISP chain and passes image pixels to the update kernel block 2106. In this embodiment, the input interface 2206 provides certain data from the ISP chain to the update kernel block 2106. Examples of this data include, but is not limited to, S/N figures, image histograms, exposure time, digital and analog gains, de-noising information, white-balance information, and pixel location.

The update kernel block 216 updates a kernel 215 that is to be used for convolution of a signal matrix formed from selected image pixels. Herein, several example parameters which are based on factors such as S/N ("alpha"), spatial location ("beta"), local characteristics ("gamma") are discussed. The kernels may be updated based on one or more of these parameters, or other parameters. Thus, the kernel update is not limited to these parameters. The convolution block 2206 convolves signal matrices (based on the image pixels) with the updated kernels and final results.

The method for modifying the kernels using calculated metrics (e.g. "alpha", "beta", "gamma", . . . ) is as follows—once a metric is calculated, that is within a dynamic range of 0 and 1 (if not, it is possible to convert it to such a dynamic range), the effect of the kernels can be lowered using the following update formula (for example—a 3×3 kernel):

$$\underbrace{\begin{bmatrix} b_{11} & b_{12} & b_{13} \\ b_{21} & b_{22} & b_{23} \\ b_{31} & b_{32} & b_{33} \end{bmatrix}}_{Final\ kernel} = metric \cdot \underbrace{\begin{bmatrix} a_{11} & a_{12} & a_{13} \\ a_{21} & a_{22} & a_{23} \\ a_{31} & a_{32} & a_{33} \end{bmatrix}}_{Initial\ kernel} + (1 - metric) \cdot \begin{bmatrix} 0 & 0 & 0 \\ 0 & 1 & 0 \\ 0 & 0 & 0 \end{bmatrix}$$

This formula creates the desired effect of lowering the effect of the kernel if the metric is close to 0, and leaving the initial kernel as is if the metric is close to 1. The final kernel is a linear combination of 2 krenels—the initial kernel and a kronecker-delta kernel. The kronecker-delta kernel, convolved with an image, leaves it as it is, without changing it. Thus, combining it with the initial kernel, when the coefficients that multiply the kernels add-up to 1, ensure that the initial kernel effect is lowered in strength, depending on the metric, while ensuring that no changes are applied to the DC frequency component of the image (since the sum of all coefficients in the final kernel remains 1).

In another embodiment, the kronecker-delta kernel is replaced by another kernel, for example a kernel with a stronger effect than the initial kernel, and thus an effect of increasing the effect power of the processing can be achieved, depending on the metric.

4.3 Overview of Adjusting Kernel Effect by Modifying Convolution Result

FIG. 22 depicts a technique in which "scaling" is applied to the convolution result of kernels that are not necessarily modified, in accordance with an embodiment. This scaling achieves the same result as updating the kernel as depicted in FIG. 21. In FIG. 22, the input interface 2202 receives an image signal from another stage of the ISP chain and passes image pixels to the convolution block 2206. The convolution block 2206 convolves signal matrices (based on the image pixels) with unmodified kernels 215 and outputs convolution results. The convolution block 2206 performs convolution for the current pixel being processed with initial kernels, and outputs the result to block 2212.

Averager block 2212 receives the convolution result from block 2212, the current pixel values before the convolution, along with additional data from the ISP. Examples of this data include, but is not limited to, S/N figures, image histograms, exposure time, digital and analog gains, de-noising information, white-balance information, and pixel location and calculates required update metrics (alternatively, update metrics that are based on this information are calculated previously and only they are input to the averager).

The averager 2212 then averages between the convolution result and the pixel value before convolution and outputs the final result using the following formula in an embodiment:

$$\text{FinalRsult} = \text{ConvRs} \cdot \text{metric} + (1 - \text{metric}) \cdot \text{InputPixel} \qquad \text{Eq: 1}$$

In Equation 1, ConvRs is the convolution result and InputPixel is the original value of the current pixel being processed. InputPixel is used because it is the result of convolution of a kronecker-delta kernel and the signal matrix, in an embodiment. In case where the desired effect is to increase the effect of the initial kernel, InputPixel is replaced with the result of a convolution with a kernel with stronger effect than the kernel that was used to create ConvRs. The metric may be any update metric that has a dynamic range between 0 and 1, and that is built such that when it is close to 0 the desired effect is to decrease the effect of the first addend and increase the effect of the $2^{nd}$ addend in the equation, and if it is close to 1, the opposite happens (increasing the effect of the $1^{st}$ addend and decreasing that of the $2^{nd}$ in the equation in the final result). Several metrics can be used to create the final output, and also more than 2 addend may be used in the equation, as long as the multiplying coefficients add to 1. Herein, several example of metrics are based on factors such as S/N ("alpha"), spatial location ("beta"), local characteristics ("gamma") are discussed. The final result may be depended on one or more of these factors, or other factors.

5.0 Adjusting Kernel Effect Based on Various Factors

5.1 Adjusting Kernel Effect Based on S/N Figure

Example System that Updates Kernels

Figure 2:
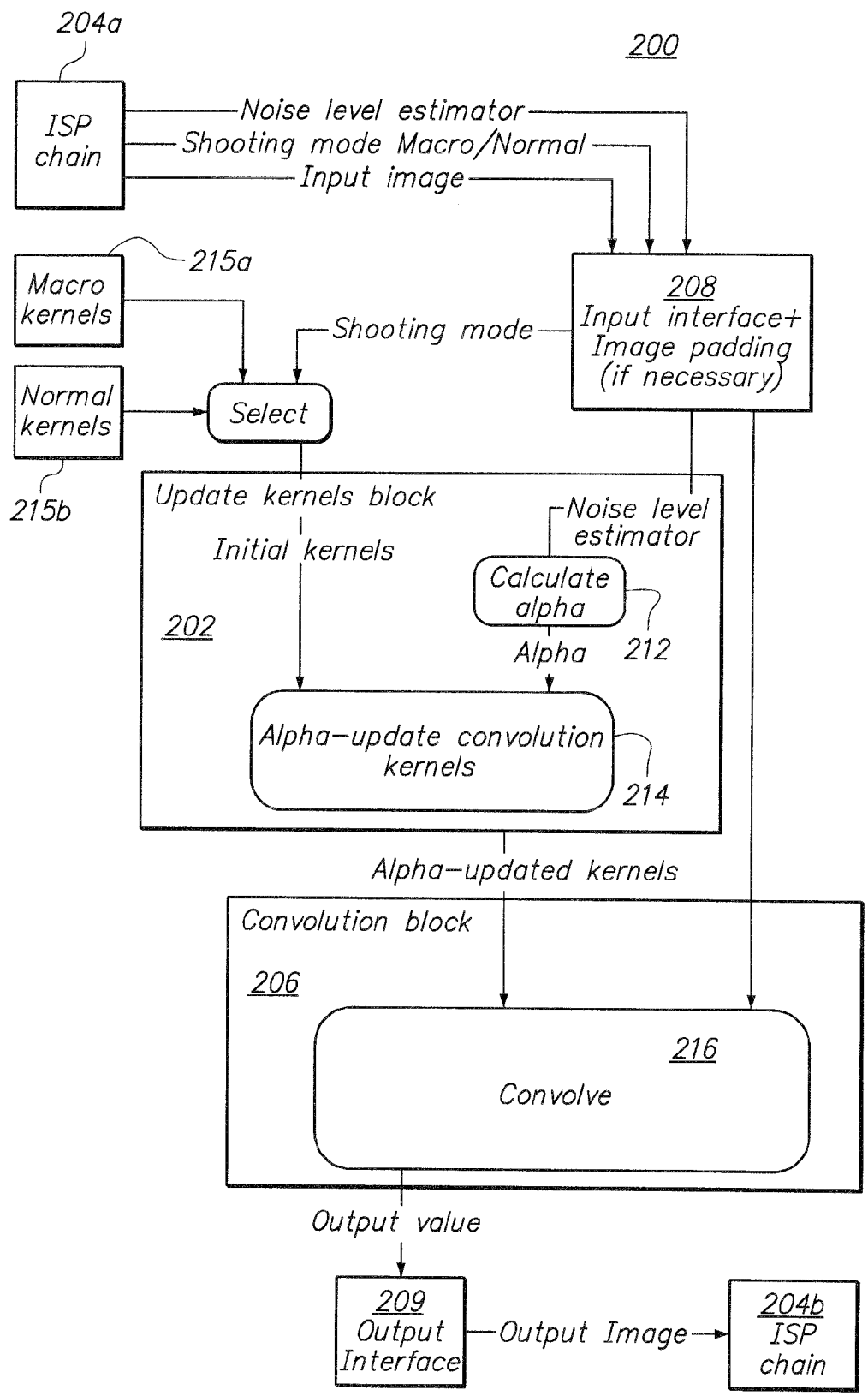
FIG. 2 depicts a block diagram illustrating an example system for updating kernel matrices and processing image data with the update kernel matrices, in accordance with an embodiment.

FIG. 2 depicts a block diagram illustrating an example system 200 for processing signal matrices to achieve a desired amount of processing based on kernel matrices. FIG. 2 depicts updating kernel matrices and processing image data with the updated kernel matrices, in accordance with an embodiment. As described elsewhere herein, it is not required that the kernels themselves be modified in order to adjust the effect of applying the kernels. In one embodiment, scaling is performed after processing the image with unmodified kernels in order to adjust the effect of processing based on the kernels. Thus, it will be understood that the various blocks in FIG. 2 are depicted for convenience of explanation and that implementing an update to a kernel does not require multiplication of a kernel by alpha as depicted in FIG. 2.

In general, the update kernel block 202 updates a selected kernel matrix based on a noise level estimator. The convolution block 206 applies the updated kernel to image data, which are output to the output interface 209. In one embodiment, the update kernel block 202 and convolution block 206 form a part of the auto focus block 111 of FIG. 1b or 1c. In an embodiment, the upstream portion of the ISP chain 204a provides the following parameters to the input interface 208:
i. Shooting mode.
ii. Noise level estimator.
iii. The input image.

The shooting mode is used to determine which set of kernels 215a, 215b to use, in an embodiment. The example system of FIG. 2 depicts kernels for a macro mode and a normal mode. However, there could be kernels for other modes such as, night, scenery, etc. The shooting mode can be any type of scene that requires special treatment for the kernels. In one embodiment, the shooting mode is based on user-selection. For example, the user can select between a macro mode and a normal mode. In another embodiment, the shooting mode is automatically determined. Based on the shooting mode, either the macro kernels 215a or the normal kernels 215b are provided as inputs to the update initial kernel block 202, in this embodiment. The coefficients for the kernels are stored in the internal memory, in an embodiment. As an example, a 16-bit signed resolution may be used to represent the coefficients.

The normal mode kernels 215b could be used for images taken between 40 cm-infinity, for example. The macro mode kernels 215a could be used for shooting close-by elements. As an example, close elements could be in the range of 20 cm-40 cm or even a closer ranges, from 10 cm to 40 cm. In one embodiment, there are two sets of three color kernels (red, green, blue): one set for the normal mode and one set for the macro mode. A different number of color kernels could be used. There may be different sizes of kernels, as well. Moreover, the support size that is used can be based on the pixel size. For example, if the pixel size is 1.75 um, the kernels support size might be 13×13. For a 2.2 um pixel size, the kernels support size might be 9×9. However, it is not required to use a larger support size for smaller pixel sizes.

The noise level estimator is an estimator of the noise level in the captured image. The noise level estimator can be represented in any format. As an example, the noise level estimator could be an integer value between 0 and 7, where 0 indicates low noise (good S/N) and 7 indicates a substantial amount of noise (bad S/N). A bad S/N may be associated with bad lighting conditions.

The upstream portion of the ISP chain 204a applies bad pixel correction (BPC) to the image data prior to providing the image pixel data as input, in an embodiment. Demosaicing is applied to the image data by the downstream portion of the ISP chain 204b after the image data has been processed by the convolution block 206, in an embodiment.

The update kernel block 202 has alpha calculation logic 212 to calculate a value referred to herein as "α" from the noise level estimator. In one embodiment, where the noise level estimator is a number between 0 and Max_noise_val, the value of α is calculated using Equation 2.

$$\alpha = (\text{Max\_noise\_val} - \text{noise\_val})/\text{Max\_noise\_val} \qquad \text{Equation 2}$$

Equation 2 indicates that the noisier the image is (the larger noise_val is), the lower is the value of α (and vice versa). Therefore, if there is little noise in the image, the value of α is close to 1. The relation between alpha and noise_val is linear in equation 2. However, a linear relationship is not required. Alpha may be dependent on noise_val in a more complex form, such as quadratic dependency, or any other, according to the relation between noise_val and the true amount of noise in the image—if noise_val is linear, alpha can be a linear function of noise_val. The update kernel block 202 has kernel update logic 214, which generates an updated version of an initial kernel, based on the value of α.

FIG. 3 shows an example equation for updating the kernels, in accordance with an embodiment. FIG. 3 indicates that the alpha-updated kernel matrix is a linear combination of two kernels: 1) the initial kernel matrix, which is multiplied by a; and 2) a delta kernel matrix, which is multiplied by 1−α. The delta kernel may also be referred to as a kronecker-delta kernel. Note that this results in the sum of the alpha-updated kernel's coefficients remaining at 1, thus preserving the "DC" value of the image. Note that implementation of the Equation in FIG. 3 does not require multiplication of the de-convolution kernel by alpha. Rather, as discussed below, alpha "scaling" can take place after convolving the image matrix with the unmodified de-convolution matrix to produce the same result.

If $\alpha$ is relatively close to 1, then the alpha-updated kernel is very similar to the initial kernel. However, if the value of $\alpha$ is closer to 0 than to 1, then the alpha-updated kernel will be more similar to the kronecker-delta kernel. For example, if $\alpha=0.2$, then the alpha-updated kernel will comprise 80% kronecker-delta kernel and only 20% of the initial kernel. In an embodiment, the initial kernel is a high pass or band pass filter in nature. Thus, if $\alpha$ is low, then the amount of sharpening that the alpha-updated kernel will cause to the image is much less than that of the initial kernel.

Note that if a kernel is a high-pass or band-pass filter it may amplify noise; therefore, weakening such a kernel when the image has low S/N can improve the S/N in the final processed image, compared to processing it with initial kernels, without updating them. This technique can weaken the initial kernel's gain. The same technique can be used to strengthen the initial kernels, by replacing the kronecker-delta kernels with kernels that have a stronger high-pass/band-pass frequency response than the initial kernels. The convolution logic 216 in the convolution block 206 convolves the current portion of the input image with the alpha-updated kernel and outputs a value to the output interface 209. The output image has the same resolution is as the input image resolution, in an embodiment.

Example System that Uses Post Convolution Scaling

Figure 16:
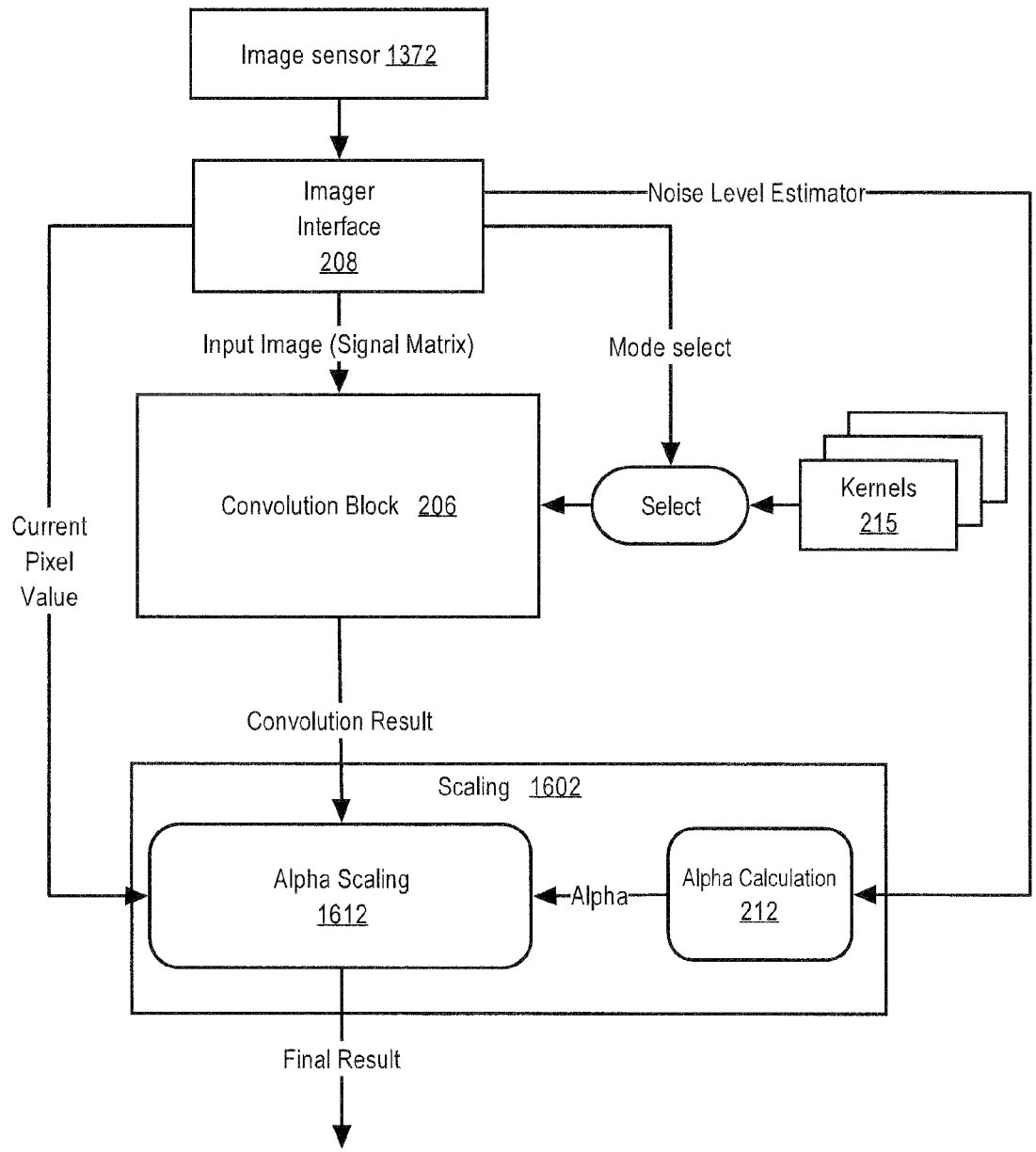
FIG. 16 is block diagram of a system for processing a signal, in accordance with an embodiment.

As previously discussed, it is not required that the kernels be multiplied by alpha to achieve an alpha update. FIG. 16 depicts an embodiment in which "scaling" is applied to the convolution result of unmodified kernels. This scaling achieves the same result as updating the kernel with alpha as depicted in FIG. 2. In FIG. 16, the imager interface 208 receives an image signal from the image sensor 1372 and passes signal matrices to the convolution block 206. The mode select signal from the imager interface 208 is used to select one or more kernels 215, which are provided to the convolution block 206. Examples of different modes have been previously discussed. The convolution block 206 convolves the signal matrices with the unmodified kernels and outputs convolution results. Each convolution result includes a value for one of the entries of the signal matrix currently being processed.

In this embodiment, the imager interface 208 provides a noise level estimator signal to the scaling 1602, which calculates "alpha" using alpha calculation logic 212. The alpha calculation may be performed in a similar manner as the embodiment depicted in FIG. 2. The alpha scaling 1612 inputs the convolution result, alpha, and the original value for the current pixel being processed, and outputs a final result for a current pixel. The current pixel is the center pixel of the signal matrix, in one embodiment. In one embodiment, the alpha scaling 1612 performs the following:

$$\text{FinalRsult} = \text{ConvRs} \cdot \alpha + (1-\alpha) \cdot \text{InputPixel} \qquad \text{Equation: 3}$$

In Equation 3, ConvRs is the convolution result and InputPixel is the original value of the current pixel being processed. Thus, the final processing result for the current pixel is a weighted sum of the convolution result using unmodified kernels and one or more other values. Those other values include, but are not limited to, the original pixel value in the input image. The alpha parameter is used as a weighting (or scaling) parameter, in this embodiment.

5.2 Adjusting Kernel Effect According to Spatial Location

Example System

Figure 4:
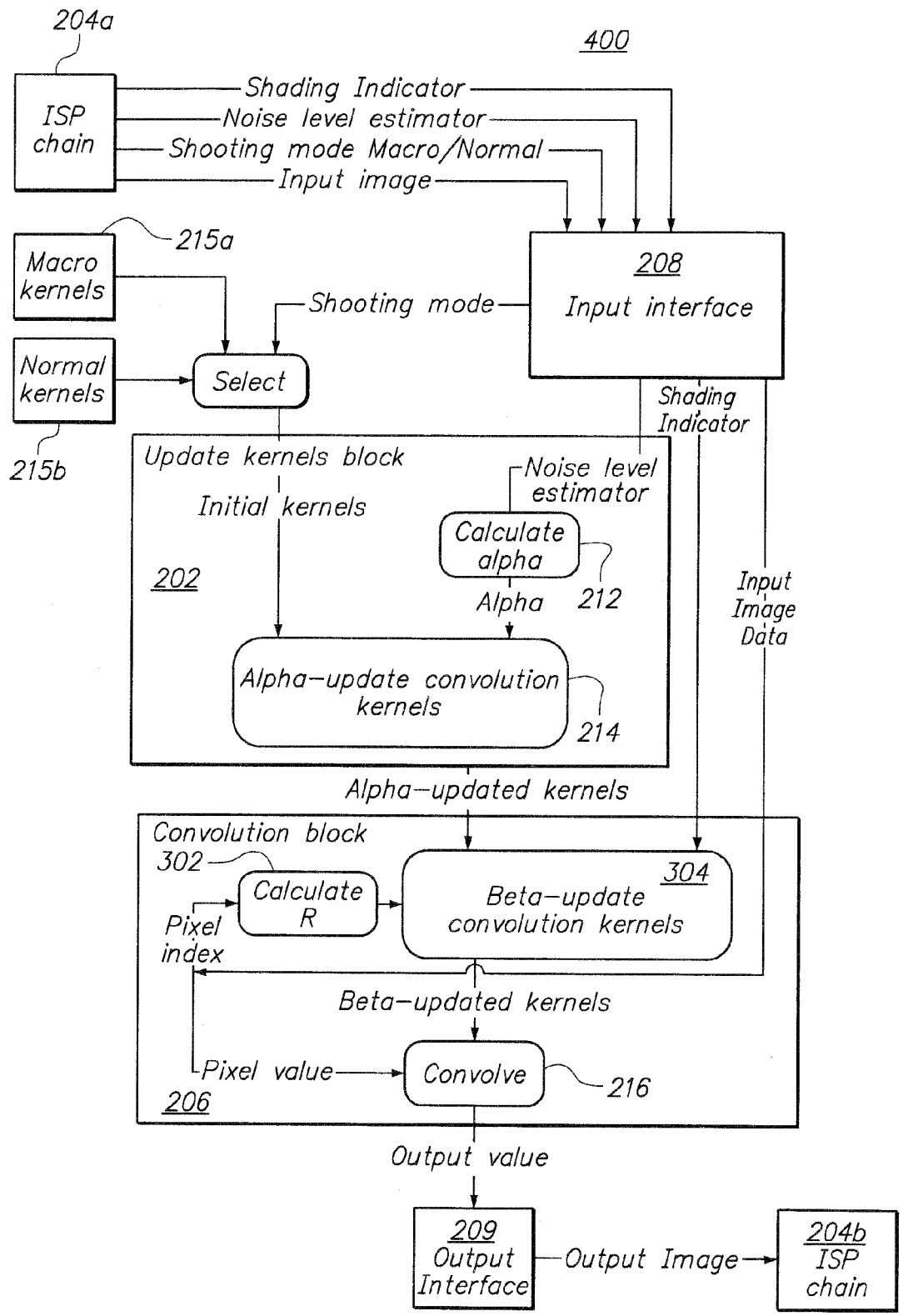
FIG. 4 depicts a block diagram of a system in which a "shading indicator" is used to modify convolution kernels, in accordance with an embodiment.

In one embodiment, the effect of applying de-convolution kernels to an image is modified according to spatial location. In one embodiment, the spatial location is based on a shading profile for the lens used to capture the image data. FIG. 4 depicts a block diagram of a system 400 in which beta-update logic 304 in the convolution block 203 uses a "shading indicator" to modify the alpha-updated convolution kernels after they have been modified by the update kernel block 202. The shading indicator defines the amount of lens-shading, and may be described relative to the center in the image data. If desired, the beta-update to the kernels could be performed prior to the alpha-update to the kernels or without the alpha-update. As described elsewhere herein, it is not required that the kernels themselves be modified in order to adjust the effect of applying the kernels. In one embodiment, scaling is performed after processing the image with unmodified kernels in order to adjust the effect of processing based on the kernels. Herein, the adjustment based on the shading indicator is referred to as a "beta-adjustment."

FIG. 6 depicts an equation for updating a kernel based on a shading parameter, in accordance with an embodiment. Note that the equation in FIG. 6 describes a beta update to the alpha-updated kernel. The initial kernel coefficients are marked with tags to indicate that the initial kernel was updated with $\alpha$. As previously discussed, the beta update to the kernel may be performed prior to the alpha update. Moreover, in an embodiment, the beta-update can be performed without performing the alpha-update. If beta-update is performed on the kernels, the convolution is a non-linear convolution (i.e., a convolution where the kernels change for each pixel depending on more than one condition). Note that implementation of the Equation in FIG. 6 does not require multiplication of the alpha updated de-convolution kernels by beta. Rather, as discussed below, alpha and beta "scaling" can take place after convolving the image matrix with the unmodified de-convolution matrix.

After performing the beta update to the relevant color kernel, the convolution logic 216 convolves the relevant color kernel with image data that is represented in an image matrix. The relevant color kernel is determined based on the color of the center pixel in the image matrix, which is the current pixel being treated. The convolution involves multiplying the beta-updated kernel's coefficients by the matching pixels in the image matrix. The result is written to the proper place in the output image to update the value for the current pixel. Afterwards, the next pixel in the image data is processed. For example, if bayer processing is being performed, then the next pixel in the bayer image is treated. The beta-update to the kernels can provide better S/N; however, there may be less sharpening of the image at the image borders.

Examples of Beta and Shading Profiles

In an embodiment, the beta-update weakens the kernels as a function of the distance from the image's center in order to compensate for S/N penalty at the image borders caused by the lens-shading profile. FIG. 5 depicts a graph 500 of an example lens shading profile. The y-axis is the value of the shading parameter, beta. The x-axis is the distance ("R") from the center of the lens. In this example, a larger R results in a smaller beta. Thus, in this example, beta approaches one near the center of the lens and approaches zero towards the outer edge (e.g., circumference) of the lens. Note that the relationship between R and beta is non-linear in this example. The shape of the curve may be approximated in accordance with Equation 4.

$$\beta = 1 - a \cdot (R/(b \cdot \max(R)))^2 \qquad \text{Equation 4}$$

In Equation 4, $\beta$ has a value between 0 and 1. Each pixel is thus processed in accordance with its distance (R) from the lens center of the image. This distance or square distance can be calculated according to the following equations:

$$R = \sqrt{x\_index^2 + y\_index^2} \qquad \text{Equation 5}$$

$$R^2 = x\_index^2 + y\_index^2 \qquad \text{Equation 6}$$

In these equations, x_index and y_index are the indices of the pixel in the image (x for columns and y for rows), while the center pixel in the image is indexed [0, 0]. The values of "a" and "b" are constants that impact the amount of shading.

The values for "a" and "b" may change and may be provided by the upstream ISP chain 204a. Thus, the shading indicator provided by the upstream ISP chain 204a defines the constants a and b, in one embodiment. In another embodiment, the shading indicator is calculated based on image statistics. For example, the shading indicator may be calculated by the convolution block 206 based on the coordinates of the pixel data and a S/N associated with the image data. The S/N may be provided by the upstream ISP chain 204a. In a further embodiment, a and b are set according to the lens shading profile such that they meet the lens shading profile characteristics, and are fixed, without any need for a shading indicator.

The R calculation logic 302 in the convolution block 206 determines R for at least some of the pixels. Based on the value of R, the beta-update logic 304 accesses (or determines) the value for $\beta$. That is, $\beta$ may be accessed from a table or calculated at runtime. Typically, $\beta$ is accessed from a table to save processing time, based at least on part on the value of R for the pixel currently being processed. However, $\beta$ could be calculated on-the-fly.

Because the value of R differs only slightly from one pixel to its neighbor, it is not required that a new value of R be calculated for every pixel. Thus, it is not required that a beta-update be performed on the kernel for each pixel. Therefore, the beta-update can be performed every few pixels or even greater and still achieve the desired effect.

It is possible to choose between different shading profiles for the same lens; however, a constant profile may be chosen for a specific lens design. In an embodiment, the shading indicator is an integer value between 0 and 8, where 0 indicates no shading at the borders, and 8 indicates severe shading at the borders. However, values outside of this range could be used.

Alternative Embodiment For Determining the $\beta$ Coefficient

This section describes an alternative technique to determine $\beta$, based on a value "R", which describes a relative location of the pixel data with respect to the lens. In this embodiment, first the values of $R^2$ may be shifted to a smaller dynamic range. Equation 7 is an example of performing such a shift.

$$f(R):R^2[0 \ldots \max(R^2)] \rightarrow [0 \ldots 15] \qquad \text{Equation 7}$$

After shifting the value of R to a smaller dynamic range, Equation 8 may be used to calculate beta:

$$\beta = 15 - p \cdot f(R)/q \qquad \text{Equation 8}$$

The constants "p" and "q" impact the amount of shading, and thus adjust the strength of the kernel. These constants thus serve a similar purpose to the constants "a" and "b" discussed in the previous technique for determining beta, but are not the same constants. The values for "p" and "q" may be provided by the ISP chain 204a (e.g., the shading indicator may define these constants). Alternatively, suitable values for p and q can be determined by the convolution block 206. As an example, p and q might be determined based on image statistics. However, p and q may also be determined by the lens shading profile and remain fixed. Note that in this equation the final value of $\beta$ may be between 0 and 15 (i.e., 4 bits are used here to represent $\beta$). However, $\beta$ can have any desired dynamic range, according to the implementation.

The amount of weakening of the kernels at the borders of the image can be adjusted based on "p" and "q". For example, if p=0 and q=1, then there will be no weakening of the kernels at the image border. If p=1 and q=1, then the kernels will become kronecker delta functions at the image border. Thus, the kernels will be weakened.

The shading profile according to which the kernel's gain is updated may be other than a function of R^2. For example, it may be a function of R, or a non-rotationally symmetric function. In these other cases, the formula to calculate beta will be somewhat different. For example, a polynomial may be used for this function such as illustrated in the following equation:

$$\beta(R) = a_0 + a_1(R/\max(R)) + a_1(R/\max(R))^2 + \ldots + a_n(R/\max(R))^n \qquad \text{Equation 9}$$

In equation 9, $\beta$ may have a final value between 0 and 1.

Also, adjusting based on lens shading profiles could be used to strengthen the kernels in the image borders instead of weakening them. In this embodiment, replacing the kronecker-delta kernels with kernels that have a more aggressive high-pass/band-pass frequency response and the initial kernels coefficients are adjusted accordingly. The reason for wanting to strengthen the kernels is that in general, for a given lens, the PSF is usually larger at the borders of the field of view (FOV) than in the center of it.

Spatial Dependent Processing

The example of adjusting kernel effect based on lens shading profile is one technique for adjusting kernel effect based on spatial (or pixel) location. However, this is not the only technique for adjusting kernel effect based on spatial location. In one embodiment, different kernels are stored, or derived during image processing, to process different regions of the image sensor differently to account for location dependent optical aberration. This location dependent processing can be as fine grained as single pixel regions, but the different regions could have more than a single pixel.

For example, an optical aberration can be calculated for different regions of the image sensor. The size of each region could be as small as a single pixel, but might include more than a single pixel. In one embodiment, a de-convolution kernel is established for each region ("region kernel") to counter-act the optical aberration for pixels in that region. A different region kernel could be stored for each region. Alternatively, a single region kernel might be stored for multiple regions, with an adjustment being made to the kernel to achieve different processing for different regions.

Adjusting Kernel Effect with Post De-Convolution Scaling

Figure 19:
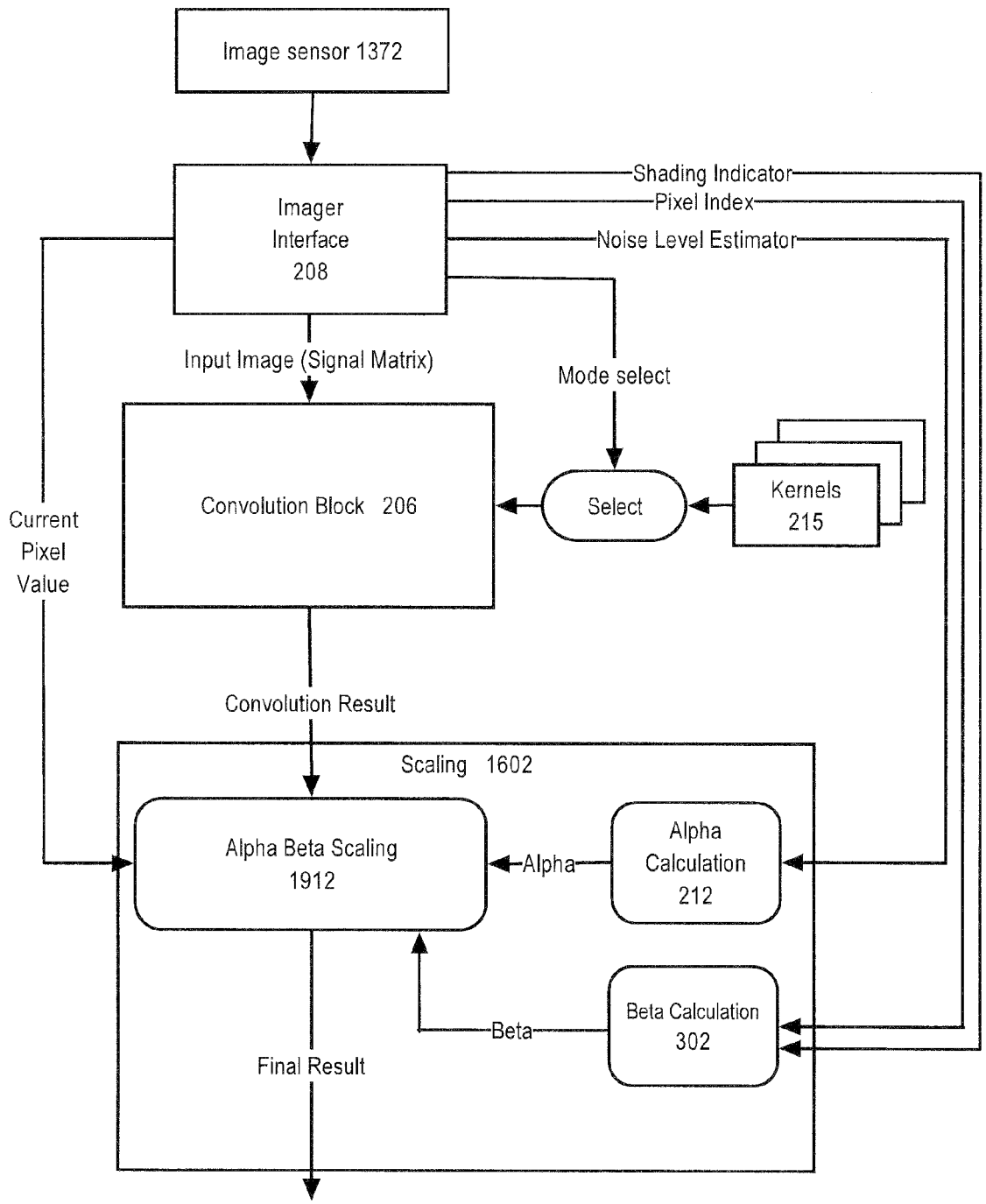
FIG. 19 is a block diagram depicting a system for adjusting the strength of kernel processing based at least on a shading parameter, in accordance with an embodiment.

As previously discussed, it is not required that kernels be multiplied by alpha and beta place in order to achieve the result of updating the kernels with alpha and beta, as depicted in FIG. 4. FIG. 19 depicts an embodiment in which alpha and beta "scaling" is applied to the de-convolution result based on unmodified kernels. In this embodiment, the imager interface 208 provides a noise level estimator signal and a shading indicator to the scaling 1602, which calculates "alpha" using alpha calculation logic 212. The alpha calculation may be performed in a similar manner as the embodiment depicted in FIG. 2. In the present embodiment, the imager interface 208 provides a shading indicator signal and a pixel index to the scaling 1602, which calculates "beta" using beta calculation logic 302. The beta calculation may be performed in a similar manner as the embodiment depicted in FIG. 4. In one embodiment, the shading indicator is not used to determine beta. Rather, beta is determined based on the pixel index without using the shading indicator.

The alpha/beta scaling 1912 inputs the convolution result, alpha, beta, and the original value for the current pixel being processed, and outputs a final result for a current pixel. The current pixel is the center pixel of the signal matrix, in one embodiment. In one embodiment, the alpha scaling 1612 performs the following:

$$FinalRsult = ConvRs \cdot \alpha \cdot \beta + (1 - \alpha \cdot \beta) \cdot InputPixel \qquad \text{Equation: 10}$$

In Equation 10, ConvRs is the convolution result and InputPixel is the original value of the current pixel being processed. Thus, the final processing result for the current pixel is a weighted sum of the convolution result using unmodified kernels and one or more other values. Those other values include, but are not limited to, the original pixel value in the input image. The alpha and beta parameters are used as a weighting (or scaling) parameter, in this embodiment. If desired, the beta parameter could be used without alpha.

5.3 Adjusting Kernel Effect According to Local Image Characteristics

In one embodiment, the kernel effect is adjusted according to local image characteristics. The image characteristics may be local characteristics to the current pixel being processed. Adjusting the kernel effect according to the image characteristics can be performed together with the previously-discussed alpha adjustment and/or the beta adjustment. However, in one embodiment, the kernel effect is adjusted according to the image characteristics without any alpha or beta adjustment. Furthermore, adjustment to the kernel effect other than the alpha- or beta-adjustments can be performed with the techniques of this section.

One aspect of adjusting kernel effect according to the image characteristics is to adjust the level of processing (i.e., the kernel's strength or magnitude of effect) according to the center pixel value itself (or, alternatively, according to a weighted average of several pixels around the center pixel). Thus, for example, when the center pixel (or average value) has a high value, the magnitude of the effect would be larger, and when the center pixel has a low value, the magnitude of the effect will be lower. The reverse may also be used-stronger kernel effect for lower values of center pixel (or average of several pixels around the center pixel) and weaker effect for high values—depending on the need. An example to changing the magnitude of effect according to the pixel's value is given in the following equation 11:

$$FinalRsult = pixel\_val/Max\_pixel\_val \cdot ConvRs + (1 - pixel\_val/Max\_pixel\_val) \cdot InputPixel \qquad \text{Equation 11}$$

In the above equation 11, when pixel_val is high, the final result will be similar to the convolution result, and when pixel_val is low, the final result will be similar to the original pixel value, before convolution.

Another aspect of adjusting kernel effect according to the image characteristics is to identify areas in the image where the kernels should be applied with greater or lesser strength. Thus, a determination is made as to the magnitude of the effect that a kernel matrix is to have on the signal matrix. The desired effect could be image contrast, in which case the kernel could be applied for maximum effect in areas of the image where the most image contrast is desired. Alternatively, in areas in which little or no image contrast is desired, the kernels might not be applied at all or the effect of applying the kernel might be modified to cause less image contrast. In an embodiment, the effect of applying the kernels is modified to achieve a smooth transient between the minimal effect and maximal effect. In one embodiment, there is a default kernel that is applied when no adjustment to the effect is desired. The adjustment could be to increase the magnitude of the effect of the default kernel or to decrease the magnitude of the effect of the default kernel. In a further embodiment, the kernels used are low-pass filters for de-noising purposes, wherein the same metric is used to determine where to apply the kernels and with what strength.

Figure 7:
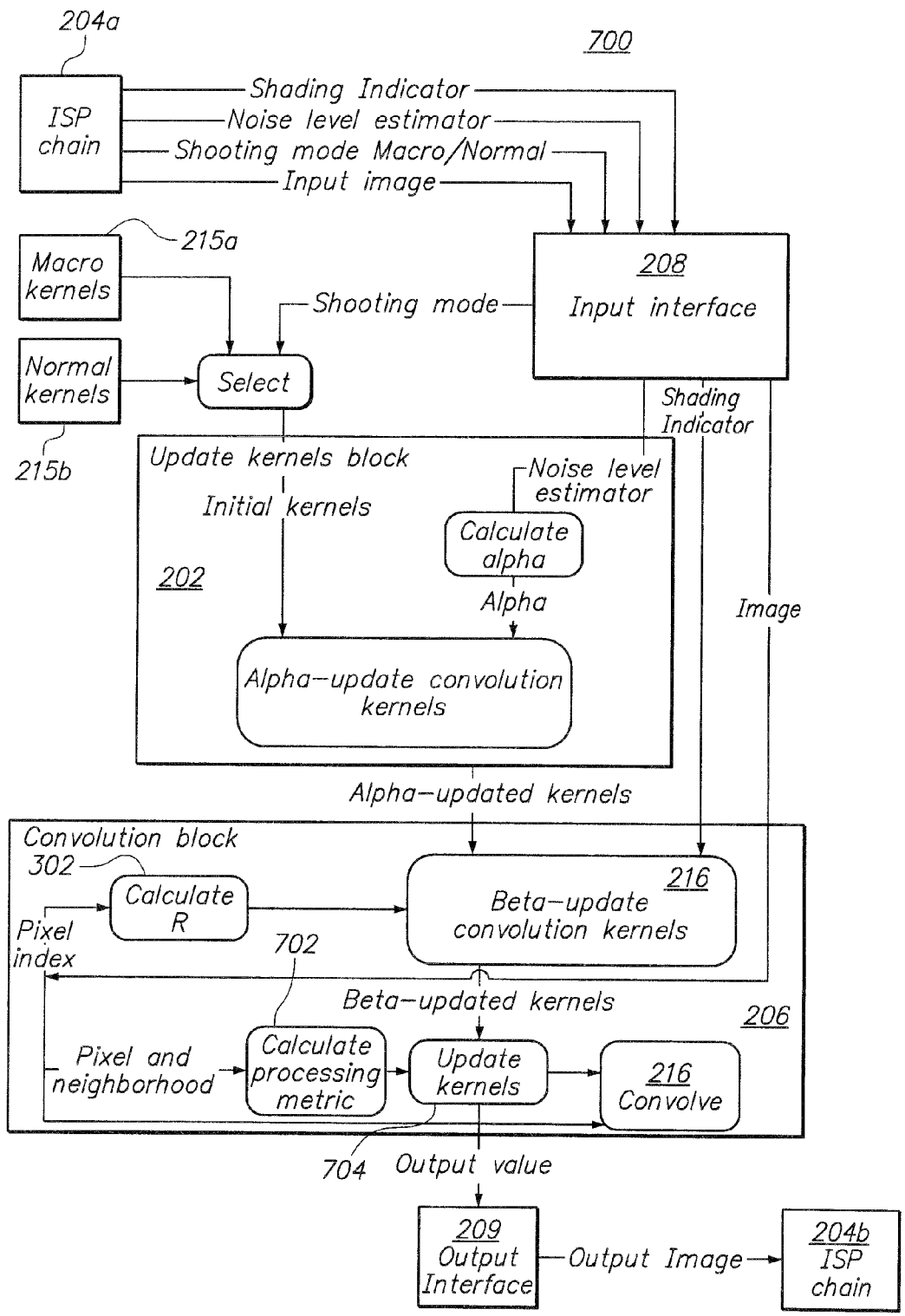
FIG. 7 depicts a block diagram of a system in which kernel update logic in the convolution block uses a "metric" to modify kernels, in accordance with an embodiment.

Architectural Overview of Adjusting Kernel Effect according to Local Image Characteristics FIG. 7 depicts a block diagram of a system 700 in which kernel update logic 704 in the convolution block 206 modifies the kernels based on a metric that is calculated based on image characteristics in the location of the pixel currently being processed. The metric itself can be modified to arrive at a value referred to herein as "gamma". In system 700, the kernels are first updated based on an alpha- and a beta-update, prior to the gamma update. However, it is not required to use the alpha- or beta-update with the gamma-update. Moreover, in this embodiment, the gamma update is after the alpha- and beta-update. However, the order of the kernel updates can be changed. As described elsewhere herein, it is not required that the kernels themselves be modified in order to adjust the effect of applying the kernels. In one embodiment, scaling is performed after processing the image with unmodified kernels in order to adjust the effect of processing based on the kernels.

The metric calculation logic 702 in the convolution block 206 calculates the metric based on analysis of the current pixel being processed and its neighboring pixels. The metric calculation logic 702 checks the current image window (the section of the image which is multiplied by the convolution kernel) for each pixel and determines a metric for the amount of desired processing for that current pixel. Then, the convolution kernels are updated by the kernel update logic 704 based on the metric. Finally, the updated kernels are applied to the image data.

Once gamma is defined from the metric, logically the method for updating the kernel may be similar to the methods used for an alpha- or a beta-update to a kernel. For example, from a logical standpoint, the updated kernel can be generated from a linear combination of the original kernels and a delta kernel, if it is desired to lower the magnitude of processing, or with a more aggressive kernel if it is desired to raise the magnitude of processing. Referring again to FIG. 3, alpha could be replaced by gamma to update the kernel. Thus, gamma affects the kernel coefficients of the linear combination of kernels. Note that if convolution is performed with kernels that are updated with gamma and the alpha and/or the beta, then non-linear convolution results. That is, convolution is performed in which the kernels change for each pixel depending on more than one condition. Notre that post de-convolution scaling as described herein can be used to achieve the result of de-convolution with an updated kernel.

Functional Overview of Adjusting Kernel Effect according to Local Image Characteristics As previously discussed, the strength of processing is adjusted based on the local characteristics around the pixel currently being processed, in this embodiment. First, the area around the current pixel is examined to determine information such as, whether there is an edge, whether the region around the pixel is relatively flat—i.e. uniform, without any changes of information in it (such as a blank gray wall)—etc. Equation 11 describes one technique of calculating the metric.

$$\text{Metric} = \sqrt{\frac{1}{N}\sum_{j=1}^{N}|P_j - \bar{P}|} \qquad \text{Equation 12}$$

In Equation 12, $P_j$ and N are pixels inside of the window, $\bar{P}$ is the mean value of the N pixels.

Examples of Determining the Metric

Following are several example methods for calculating the metric. The metrics may be computed using the current image window around the center pixel for which the output value is computed. However, it is not required that all of the pixels (for the color being processed) in the entire current image window be used. Moreover, the metric might be based on pixels that are outside of the current image window. Furthermore, it is not required that the metric be determined based only on pixels of the same color. That is, for some types of processing, it may be appropriate to include pixels of different colors in the metric calculation.

Variance/Standard Deviation Example

In one embodiment, either variance or standard deviation of pixels in the current image window is used as an indication of the existence and amount of difference in the current image window around the center pixel. If the standard deviation is used, the formula in Equation 13A or 13B may be used:

$$\text{win\_std} = \sqrt{\frac{1}{n-1}\sum_{i=1}^{n}(x_i - \bar{x})^2} \qquad \text{Equation 13A}$$

$$\text{win\_std} = \sqrt{\frac{1}{n}\sum_{i=1}^{n}(x_i - \bar{x})^2} \qquad \text{Equation 13B}$$

In Equations 13A and 13B, $x_i$ are the pixels in the current image window, "n" is the number of pixels in the current image window and $\bar{x}$ is the mean value. As previously discussed, the pixels in the current image window are all of the same color, in an embodiment. The mean value can be determined as indicated in Equation 14.

$$\bar{x} = \frac{1}{n}\sum_{i=1}^{n}x_i. \qquad \text{Equation 14}$$

However, it is not required that all pixels take part in the mean calculation in an embodiment. Furthermore, in an embodiment, weighted average is used instead of simple average, in which pixels that take part in the mean calculation are weighted according to spatial location relative to the center pixel, or according to another weighting scheme. The weights are normalized to 1 so that the average value for a uniform area remains the same. The weighted average is exampled in the following equation (where Wi are the weights):

$$\bar{x} = \frac{1}{n \cdot \sum_{i=1}^{n} w_i}\sum_{i=1}^{n} w_i x_i \qquad \text{Equation 15}$$

If $x_i$ are considered to be random variables, these are the unbiased and biased estimators for the standard deviation. Next, in an embodiment, two values are computed—a maximum value for the win_std in the current image window, and a minimum value for the win_std in the current image window. These values are computed according to Equations 16a and 16b.

$$\text{Max\_std\_val} = \max_{x_i}(|x_i - \bar{x}|), i = 1\ldots n \qquad \text{Equation 16a}$$

$$\text{Min\_std\_val} = \min_{x_i}(|x_i - \bar{x}|), i = 1\ldots n \qquad \text{Equation 16b}$$

In Equations 16a and 16b, $\bar{x}$ is the mean value, and "n" is the number of pixels in the current image window. These minimum and maximum values bound the standard deviation from above and below. Thus, the dynamic range of the standard deviation for the current image window may be defined as in Equation 16.

$$\text{dyn\_range} = \text{Max\_std\_val} - \text{Min\_std\_val} \qquad \text{Eq. 16}$$

The kernels can be updated according to the equation depicted in FIG. 11. Note that a kernel update as described in FIG. 11 can be implemented by post de-convolution scaling by gamma, as described herein. That is, the signal matrix is convolved with the unmodified kernel matrix, and then a sum of the convolution result and the original pixel value is scaled based on gamma.

Further note that if the dyn_range=0, then all the pixels in the neighborhood of the center pixel are the same. Therefore, a delta kernel is applied for the center pixel, whether the center pixel has the same value as the rest of the pixels in the current image window (i.e., win_std=0) or whether the center pixel has a different value from the rest of the pixels. Note that it may be that no processing is desired in either of the aforementioned cases. The first case may indicate that the current image window is a "flat area" (e.g., a wall, blue sky, etc.), in which no image contrast enhancement is desired. The second case may be due to noise because no pattern is detected; therefore, image contrast enhancement may not be desired.

Furthermore, note that in the equation of FIG. 11 the sum of the two coefficients that multiply the input_kernel and the delta_kernel is 1.

If the current image window is a "flat" or nearly "flat", or even if it is a noisy region, but with a relatively low noise standard deviation, then the standard deviation will be a low value. Therefore, the coefficient that multiplies the input_kernel in FIG. 11 will be near 0, and the coefficient that multiplies the delta_kernel will be close to 1. Hence, almost no processing will occur, as desired for an image region with almost no detail in it.

However, if the current image window contains an edge between bright and dark areas, the standard deviation value will be large (e.g., close to the maximum possible value). Thus, the coefficient that multiplies the input_kernel in FIG. 11 will reach a value close to 1, and the coefficient that multiplies the delta_kernel will receive a value close to 0, which means the final_kernel will sharpen the image and regain the lost contrast. Since the dynamic range of the standard deviation is set for every pixel, there is no dependency on fixed thresholds that can change from scene to scene.

However, it is not required to calculate the minimum and maximum values in a window and use a local dynamic range. In an embodiment, a fixed dynamic range is used to normalize the standard deviation into a dynamic range of [0 1]. For example, for pixels values of 0 to 1023 (10 bits per pixel), the standard deviation can receive values of 0 to 512, thus it is possible to fix the dynamic range to that range.

Figure 15:
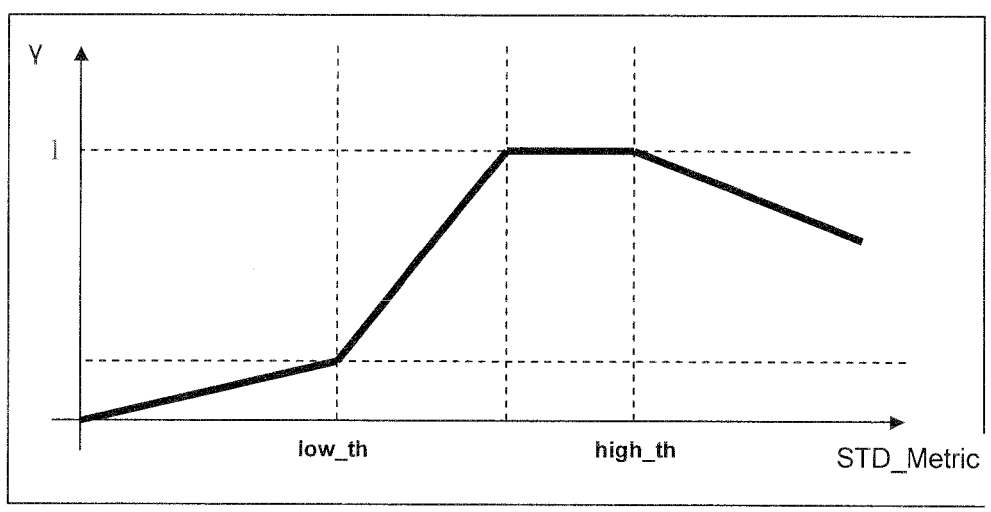
FIG. 15 is a graph that depicts a curve for determining a parameter for modifying kernels based on image characteristics, in accordance with an embodiment.

Alternatively, a more complex function can be applied on the standard deviation metric in order to change the kernels in a more sophisticated way. As an example, the dynamic range of the standard deviation can be divided to several sections, and in each a different function applied in a manner that the transitions between sections are continuous and achieve a desired effect. As an example, graph 1500 depicted in FIG. 15 illustrates a curve of gamma versus the metric, in accordance with an embodiment. Referring to FIG. 15, two thresholds are defined ("low_th" and "high_th"). If the metric is low (e.g., below "low_th"), then there is no edge information (or very little edge information) in the current image window. Therefore, the value of gamma is kept low. If the metric is between "low_th" and "high_th", then gamma is assigned a higher value. This range is evidence that an edge is present, but note that this range has an upper limit, "high_th". In the example of FIG. 15, the value of gamma is increased above the "low_th" until gamma reaches 1 at some value between "low_th" and "high_th". However, if the metric is high (e.g., above "high_th"), then the value of gamma is gradually reduced from the value of 1 that gamma received at "high_th". This reduction of gamma decreases the possibility of over-sharpening edges that are already sharp enough. According to each metric value, a gamma parameter is calculated, where gamma is between 0 to 1. The function is continuous over the whole range of the metric. The gamma value multiplies the kernels, while the (1-gamma) multiplies the kronecker-delta kernel (or, alternatively, the more aggressive kernel—according to the desired effect), in a similar manner as the alpha- and beta-updates are performed.

As an alternative to using standard deviation as a metric for gradient-presence identification, variance can be used, according to the following formula:

$$\text{win\_var} = \frac{1}{n-1}\sum_{i=1}^{n}(x_i - \bar{x})^2 \quad \text{Equation 17}$$

or $$\text{win\_var} = \frac{1}{n}\sum_{i=1}^{n}(x_i - \bar{x})^2$$

In Equation 17, the notations are the same as in the standard deviation formula. In this alternative, the maximum and minimum values should be determined accordingly, in order to create a suitable dynamic range (or, it is possible to use a fixed dynamic range, as stated before). In here also, the formula in FIG. 11 can be used to update the kernels, or a more complex function can be used, as stated above.

As a further alternative to using the standard deviation as a metric for gradient-presence identification, an absolute value of differences may be used according to Equation 18:

$$\text{win\_abs} = \frac{1}{n-1}\sum_{i=1}^{n}|x_i - \bar{x}| \quad \text{Equation 18}$$

or $$\text{win\_abs} = \frac{1}{n}\sum_{i=1}^{n}|x_i - \bar{x}|$$

Where the notations are the same as in the standard deviation formula. In this alternative, the maximum and minimum values should be determined accordingly, in order to create a suitable dynamic range. In here also, the formula in FIG. 11 can be used to update the kernels, or a more complex function can be used, as stated above.

Histogram Example

A similar method to the standard deviation method is to calculate the histogram on the current image window, and determine a magnitude of kernel based on the histogram. A local histogram of the current image window can be calculated by first defining a certain number of bins. This can be done, for example, according to Equation 19.

$$\#bins = \max(x_i) - \min(x_i) + 1, \, i=1 \ldots n, \, x_i \in \text{image\_window} \quad \text{Equation 19}$$

Alternatively, the number of bins can be a fixed pre-determined number. As an example, 1024 bins might be used to correspond to the number of intensity levels for a 10-bit image. Then, the bins themselves are defined, for example, by dividing the dynamic range of the image window by #bins, as described in Equation 20.

$$\text{dyn\_range} = \max(x_i) - \min(x_i) + 1, \, i=1 \ldots n, \, x_i \in \text{image\_window} \quad \text{Equation 20}$$

In this example, there will be #bins bins, each of them 1-pixel wide. It is possible to divide the dynamic range to wider bins, each several pixels-values wide. Once the bins are defined, each bin is filled with the number of pixels values in the image window that fall in that bin range. FIG. 9A illustrates the data for an image window and FIG. 9B illustrates the histogram for the data.

Once the histogram of the current image window is known, in one embodiment, a determination is made as to how close the histogram is to a unimodal histogram and how close the histogram is a multimodal histogram. A unimodal histogram may also be referred to as a uniform histogram. In an embodiment, a multi-modal histogram includes bi-modal and higher order histograms.

The closer the shape of the histogram to a multimodal histogram, the stronger the indication is for a presence of edge in the current image window. It may be desirable to increase the effect of the de-convolution kernels that are applied to windows having an edge. For example, increasing the image contrast can be desirable. Alternatively, if the kernels have a low-pass frequency response, it may be desired to lower their magnitude of effect so that they do not blur edges in the image.

Figure 10A:
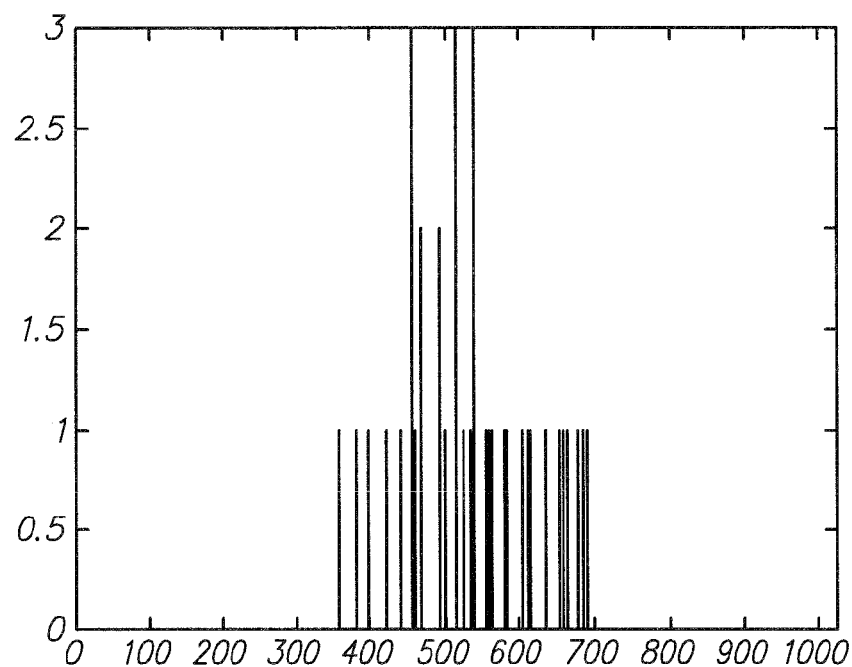
FIG. 10A illustrates a unimodal histogram.
Figure 10B:
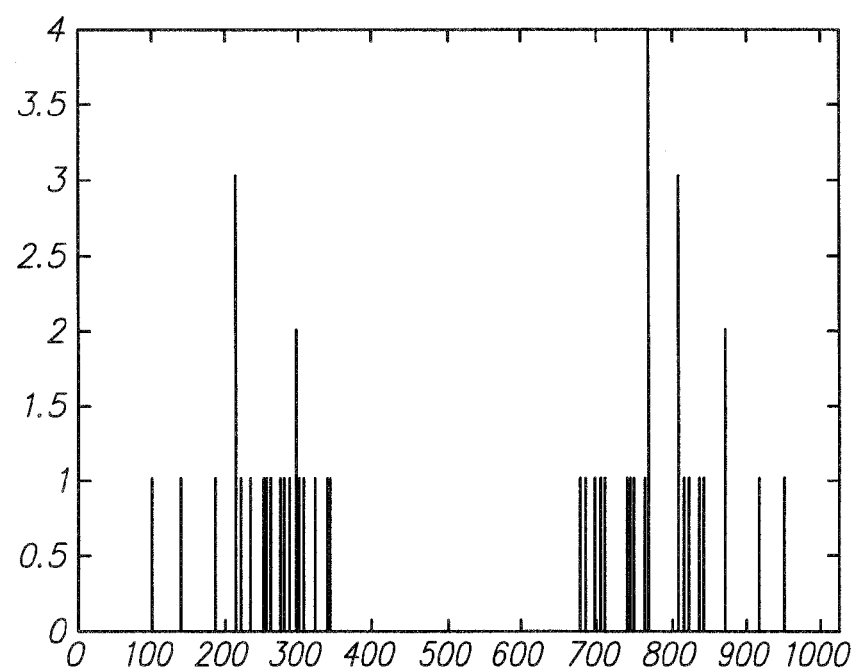
FIG. 10B illustrates a bimodal histogram.

The closer the histogram is to a unimodal histogram, the more "flat" the image window is (i.e. the more uniform it is). Therefore, it may be desirable to modify the de-convolution kernels to minimize their effect. For example, it may be desirable to not enhance image contrast in this case. A noisy image window may produce a uniform or unimodal histogram. FIG. 10A illustrates a unimodal histogram and FIG. 10B illustrates a bimodal histograms of different green image windows. These histograms were produced using 1024 bins (# of intensity levels of a 10-bit bayer image), and 41 values (# of values in a green image window for a 9×9 green kernel) to distribute.

Thus, in one embodiment, the histograms are analyzed to determine whether the distribution is unimodal, or multimodal. One technique to distinguish a unimodal histogram from a multi-modal one is to use a clustering algorithm (for example, k-means), which can be used to detect that there are two or more clusters. Furthermore, the metric can be based on the distance between the center of masses of the clusters. That distance is normalized by its dynamic range in order to arrive at the metric with which the kernel's gain is updated.

Another technique to distinguish bimodal and unimodal histograms is based on smoothing the histograms, and then looking for local maxima in it. If there is only a single local maxima, then the histogram is unimodal. However, if two local maxima are found, the range between the two local maxima points is used to derive the metric. As an example, if the range is small, then the kernels may be adjusted to have a low gain. However, if the range is large, then the kernels may be adjusted to have a high gain. These adjustments could be desirable to cause the kernels to have the most image contrast enhancement when the range is large. If three or more local maxima are found, the metric may also be based on the range between the local maxima.

There may be a relationship between the previously discussed standard deviation technique and the shape of the histogram. A current window matrix with pixels whose values have a high standard deviation may have a histogram shape with two or more peaks, where pixel values are far from the mean value. On the other hand, a current window matrix with pixels whose values have a low standard deviation may have a histogram having a single-peak histogram, where most of the pixel values are close to the mean value.

Edge Detection Examples

In one embodiment, determining the metric is based on detecting edges in the image. For example, a convolution mask can be used to find the edges in the current image window. Examples of convolution masks that could be used include, but are not limited to, Sobel, Laplacian, Prewitt, and Roberts. In one embodiment, an edge-detection mask is applied on the current image window to detect edges. A statistical measure such as the standard deviation of pixels in the window is applied on the result. The metric is then based on the standard deviation result. In another embodiment, an edge-detection mask is applied on the image window to detect edges. In the edge detection embodiment, the kernels are applied based on whether or not an edge was found.

Edge Enhancement Embodiment

Since the sum of coefficients in the edge detection mask is 0, the resulting image window will contain strong positive and negative values if there are edges in the original image window. Therefore, an image window that contains an edge will have a high standard deviation value, and consequently, a high processing-metric. On the other hand, if the window has data for a "flat", uniform, region in the image, or even a noisy region, but with a relatively low noise standard deviation, the edge-filtered image will have pixel values that are close to one another (typically close to 0). Therefore, the edge-filtered image will have a low standard deviation value and a low processing-metric. In one embodiment, a fixed pre-determined threshold value is used for normalizing the standard deviation such that the final processing-metric is a value between 0 and 1. The metric calculation can be determined as indicated in Equation 21:

$$p\_metric = \frac{std}{edge\_std\_threshold} \qquad \text{Equation 21}$$

if (p_metric > 1) p_metric = 1

The kernels may be updated in a similar manner as depicted in FIG. 3. However, the p_metric replaces alpha.

The normalization of the standard deviation results in a smooth gradient of change to the processing-metric, from low values to high values, and thus creates a continuous and smooth processing and eliminates artifacts in the output image.

Table II provides example values of an edge detection for a bayer image for green bayer processing. If the green pixels are divided to Gr (green in a red row) and Gb (green in a blue row), it is possible to use table III for all pixels (Gr, R, B and Gb). Table III provides example values of an edge detection mask for red or blue bayer processing.

TABLE II

| -1 | 0  | -1 | 0  | -1 |
|----|----|----|----|----|
| 0  | -1 | 0  | -1 | 0  |
| -1 | 0  | 12 | 0  | -1 |
| 0  | -1 | 0  | -1 | 0  |
| -1 | 0  | -1 | 0  | -1 |

TABLE III

| -1 | 0 | -1 | 0 | -1 |
|----|---|----|---|----|
| 0  | 0 | 0  | 0 | 0  |
| -1 | 0 | 8  | 0 | -1 |
| 0  | 0 | 0  | 0 | 0  |
| -1 | 0 | -1 | 0 | -1 |

As non-limiting examples, edge detection masks for a processing that is performed on an image after demosaicing can be the well known Sobel, Prewitt, Roberts, and Laplacian masks.

Edge Detection Embodiment

In an edge detection embodiment, an edge-detection mask (fit for a bayer pattern if the processing is done on a bayer image) is applied on the image window to discover edges. A threshold may be used to determine whether an edge is present or not, taking into account an a-priory assumption that there is a pattern to how edges appear in natural images. For example, a single pixel that is different from the others may be random noise as opposed to valid image data. The threshold can be updated according to results achieved for adjacent pixels, so as to decrease the possibility of falsely detecting noise, as opposed to detecting an edge. A possible implementation for this method can be as follows.

First, an edge-detection mask is applied on the current image window. If there are absolute values above current threshold, check if they form a line or other pattern. An indication of a line or other pattern could be that several adjacent pixels have high absolute values. If a line or other pattern is found, declare that the current image window contains an edge. If no pixels have an absolute value above the threshold, or if the pixels having a high absolute value do not form a line or other pattern, then the current image window is regarded as containing a "flat" (possibly noisy) area.

De-convolution kernels are then applied to the current image window according to whether an edge was found or not found. For example, if an edge was found, strong de-convolutions kernels may be applied. Otherwise, weak de-convolution kernels may be applied to the window. Moreover, setting the de-convolution kernels gain can be done according to the "strength" of the edge. For example, in the cases in which an edge was found, the standard deviation of the pixels in the image window is calculated after applying the edge mask. The gain of the kernel is then based on the standard deviation metric, in a similar way to the standard deviation method stated above.

Other methods of edge detection can also be employed. For example, other edge-detection masks including, but not limited to, Roberts, Prewitt, Sobel, or Canny, may be used to determine whether there is an edge in the window.

Entropy Based Example

In one embodiment, the magnitude of the kernels (e.g., high-gain or low-gain de-convolution kernels) to be applied on the image window is based on the entropy in the current image window. Higher entropy may suggest that there is a great deal of information in the current image window, and thus it may be desirable to apply stronger kernel to that window. A "flat" image window may have low entropy; therefore, it may be desirable to apply a weaker kernel to that window processing-metric. The entropy calculation can be determined as described in Equation 22.

$$\text{Entropy} = -\sum_{i=o}^{1023} p_i \log(p_i) \quad \text{Equation 22}$$

In Equation 22, $p_i$ is the empiric probability of pixel-value i in the current image window. If, for example, the image window is "flat", then the entropy is 0, and if it contains an edge (pixels with different intensity values), than the entropy will receive a high value. The actual processing-metric can be determined by normalizing the entropy value from Equation 22.

However, since the entropy does not take into account the amount of difference between the pixels, a high entropy value may result from random noise. Therefore, in one embodiment, the S/N of the image is used to determine whether to use the entropy technique.

Gradients Based Example

In an embodiment, the presence of an edge is determined by calculating several local gradients around the center pixel in the window that is currently being processed. A metric is then calculated according the gradients' amplitude, for example, according to a weighted average of the gradient's amplitude. The gradients could be taken according to the following examples:

TABLE IV

| 1 | | 2 | | 3 |
|---|---|---|---|---|
| | 4 | | 5 | |
| 6 | | 7 | | 8 |
| | 9 | | 10 | |
| 11 | | 12 | | 13 |

From Table IV, possible gradients are: |1-13|, |2-12|, |3-11|, |6-8|, |4-10|, |5-9|.

TABLE V

| 1 | 2 | 3 |
|---|---|---|
| 4 | 5 | 6 |
| 7 | 8 | 9 |

From Table V, possible gradients are: |1-9|, |2-8|, |3-7|, |6-4|.

Table IV shows pixels locations for a 5×5 support for the green color in a bayer image, and table V shows the pixels locations for a 5×5 support for the red and blue colors in a bayer image. When calculating a weighted average of the gradients, the weights can be determined by the spatial distance between pixels that take part in a certain gradient.

Once the metric is computed, the kernels update mechanism can be as proposed previously. That is, the metric may be normalized according to a possible dynamic range to determine a "gamma". Then, techniques disclosed herein to affect the de-convolution kernels gains as used in the alpha and beta updates, can be used for the gamma update.

In an embodiment, the method for creating the metric is comprised of a weighted combination of some of the above stated methods. For example, the final metric is based on a weighted average of the standard deviation metric and the gradients metric, or any other combination of 2 or more metrics is used to create the final metric.

Adjusting Kernel Effect with Post Convolution Scaling

Figure 20:
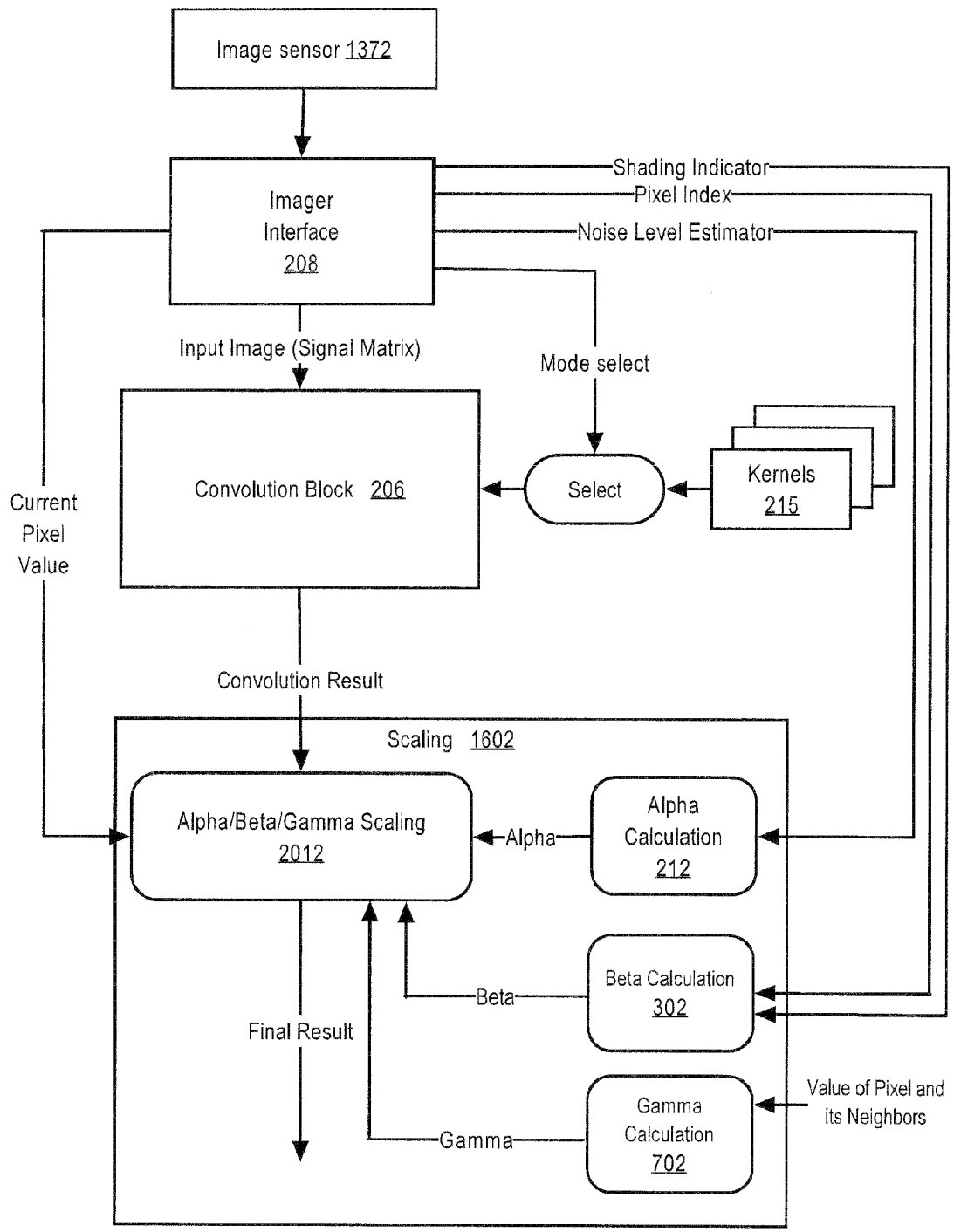
FIG. 20 is a block diagram depicting a system for adjusting the strength of kernel processing based at least on characteristics of pixels in a neighborhood, in accordance with an embodiment.

It is not required that the image processing based on alpha, beta, and gamma involve multiplying the kernel by gamma. FIG. 20 depicts an embodiment in which alpha, beta, and gamma "scaling" is applied to the de-convolution result of unmodified kernels. In this embodiment, the imager interface 208 provides a noise level estimator signal and a shading indicator to the scaling 1602, which calculates "alpha" using alpha calculation logic 212. The alpha calculation may be performed in a similar manner as the embodiment depicted in FIG. 2. In this embodiment, the imager interface 208 provides a shading indicator signal and a pixel index to the scaling 1602, which calculates "beta" using beta calculation logic 302. The beta calculation may be performed in a similar manner as the embodiment depicted in FIG. 4. In this embodiment, the imager interface 208 provides the value of the current pixel and its neighbors to the scaling 1602, which calculates "gamma" using gamma calculation logic 702. The gamma calculation may be performed in accordance with any of the techniques disclosed herein.

The alpha/beta/gamma scaling 2012 inputs the convolution result, alpha, beta, gamma and the original value for the current pixel being processed, and outputs a final result for a current pixel. The current pixel is the center pixel of the signal matrix, in one embodiment. In one embodiment, the alpha scaling 1612 performs the following:

$$\text{FinalRsult} = \text{ConvRs} \cdot \alpha \cdot \alpha\chi + (1 - \alpha \cdot \beta \cdot \chi) \cdot \text{InputPixel} \quad \text{Equation 23}$$

In Equation 23, ConvRs is the convolution result and Input-Pixel is the original value of the current pixel being processed. Thus, the final processing result for the current pixel is a weighted sum of the convolution result using unmodified kernels and one or more other values. Those other values include, but are not limited to, the original pixel value in the input image. The alpha, beta, and gamma parameters are used as a weighting (or scaling) parameter, in this embodiment. Any combination of the alpha, beta, and gamma parameters could be used.

6.0 Adjusting Kernel Effect to Treat Motion Blur in Accordance with an Embodiment

6.1 Overview of Correcting Motion Blur

Motion-blur is a blur in an image that may be caused by movement of the camera during image capture. Motion-blur often occurs when capturing images with long exposure times (e.g., in low light conditions). Often, motion blur can be characterized by a PSF that is directional. For example, a horizontal line means a blur that was caused by a horizontal movement of the camera.

Compensating for motion blur generally comprises determining the motion blur and correcting for the determined motion blur. Determining the motion blur includes determining the direction, amount and characteristics of the movement, which may be specified with motion vectors. The motion vectors can be measured by a gyroscope, deduced from the image itself, from a set of images, or extracted by other means. De-convolution kernels may be applied to the image to correct the determined motion blur.

Various image processing algorithms are described herein in which the effect of applying certain spatial image processing kernels may be adjusted according to various factors such as S/N, lens shading profile, optical aberrations that are dependent on pixel location, and characteristics of the image in the location of the pixel currently being processed. In an embodiment, motion blur may also be corrected in the same IP block in which the aforementioned spatial image processing kernels are applied. Herein, the spatial image processing kernels may be referred to as kernels to correct "lens PSF". Thus, motion-blur as well as lens PSF blur may be corrected at the same time. Since motion-blur and lens PSF blur can be modeled as a PSF convolved with an image, the combined blur can be modeled by convolving both motion-blur PSF and lens PSF. Thus, in an embodiment, the de-convolution kernels can be adjusted to match the combined motion-blur PSF and lens PSF.

If used, motion vectors may be extracted either from a single frame of the image or a sequence of frames. As a non-limiting example, a gyroscope can be used to help define the motion vectors. In one embodiment, a motion-blur PSF is deduced from the motion vectors according to the direction (or several directions) of the motion. A de-convolution inverse kernel is calculated from the motion-blur PSF, in embodiments.

However, deducing a motion-blur PSF from the motion vectors is not a required. Rather, information from the motion vectors themselves may be enough to correct for motion blur without deducing a motion-blur PSF. Alternatively, the motion blur information might already be given by the form of a (motion blur) PSF, wherein the motion vectors are not necessary to deduce the motion blur PSF.

From either the motion blur PSF or motion vectors, a de-convolution inverse kernel is determined, in embodiments. The de-convolution inverse kernel matches the blur direction and shape and is meant to sharpen the image. In one embodiment, the de-convolution kernel can be chosen from a set of kernels that match the possible directions of the motion-blur PSF. These de-convolution kernels are kept in memory and consist of a large number of possibilities for motion blur. The chosen kernel matches a PSF that is a convolution of the lens PSF and the motion-blur PSF in the direction of the motion vectors, in an embodiment. Choosing the kernel may be done using a matching algorithm.

Once the de-convolution kernel is determined by either calculation or selection, the image can be processed by convolving the image with the de-convolution kernel, while taking into account adjustments to the de-convolution kernel according to the S/N, pixel location, lens shading profile, and image characteristics, as mentioned in the above sections. Note that the de-convolution kernels could treat other optical aberrations than blur and the kernels can have any desired frequency response). In an embodiment, motion blur correction may be integrated into the sharpening block 114 as described herein without any increase in silicon size. For example, hardware used to implement the sharpening algorithm is used for the motion blur correction. Thus, techniques disclosed herein are relatively cost-efficient in terms of resources (e.g., silicon size/gate count, processor cycles, power consumption, complexity), as compared to treating the motion blur and PSF blur separately in two different ISP blocks.

6.2 Blurry Point Spread Function Embodiment

Figure 17:
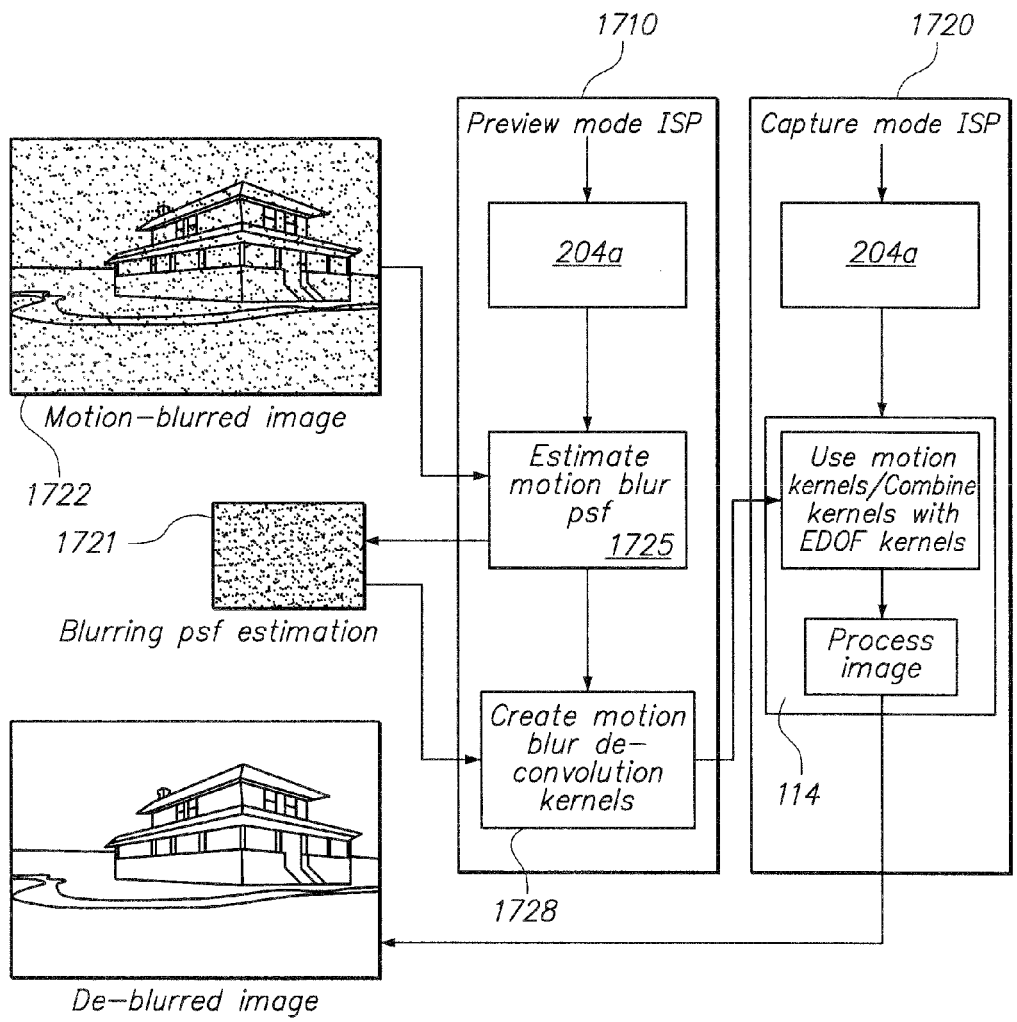
FIG. 17 depicts correcting motion blur, in accordance with an embodiment.

One way of implementing motion blur correction is to estimate the characteristics of the motion blur and create the matching de-convolution kernels ("motion blur kernels") during preview mode. This approach is illustrated in the embodiment depicted in FIG. 17. This approach identifies the motion blur by comparing frames during a pre-view mode. Then, upon entering into capture mode, the motion blur kernels and other kernels are applied to the image. The other kernels may be used for sharpening. In various embodiments, the alpha, beta, and/or gamma parameters are used to modify the strength of the effect of processing with the other kernels, as described herein.

Referring now to the preview mode ISP 1710, a blurring PSF 1721 is estimated based on a motion blurred image 1722, in block 1725. Estimating the blurring PSF 1721 may be obtained by analyzing the captured image 1722 using techniques that are known by those skilled in the art. One technique for estimating the blurring PSF 1721 by analyzing a captured image 1722 involves using gyroscopes that supply motion vectors to the camera. Another technique involves using correlation to find direction of blurring, comparing several consecutive frames, and extracting direction of movement based on the comparison. Based on the blurring PSF 1721, motion blur de-convolution kernels are created in block 1728.

Referring now to the capture mode ISP chain 1720, the motion blur kernels are provided to the logic that performs other kernel processing on the images. That other logic is digital auto focus block 111, in one embodiment. Since the convolution operation is associative (i.e., a*(b*image)=(a*b)*image), the convolution kernels from the sharpening and motion blur kernels can be combined to one kernel that will be applied on the image. If the sharpening is not enabled, but the digital auto focus block 111 is implemented in the IP chain 1720, the digital auto focus block 111 can be used for the motion blur de-convolution alone.

6.3 Motion Shift Vector Embodiment

The digital auto focus block 111 in the IP chain may be used to address the problem of a shaky image during preview mode or video streaming. In preview mode or video streaming, a spatial offset might appear between consecutive frames that causes a "shaky" image on the display. One way to treat this issue is to shift the image a predetermined amount in a direction opposite to the motion vector estimated from the last frames. Once the motion vector is estimated, this shift can be implemented within the digital auto focus block 111 by convolving the image with a kernel that causes spatial shift in the desired direction.

FIG. 18 depicts correcting motion shift, in accordance with an embodiment. The frame 1801 in each of the images 1802a-c contains the "viewed" image. Note that the frame is moving relative to the depicted house in the three images 1802a-c. The motion vector estimation logic 1810 estimates a motion vector in block 1820 based on a current frame (n) and parameters from a previous frame (n−1). For example, features are extracted from several locations in each frame. Then, the feature locations in the current frame are compared with the feature locations in one or more previous frames to calculate the motion vector. Examples of the features include, but are not limited to, edges or other unique marks in the scene that can be followed from frame to frame.

Based on the estimated motion vector, shift kernels are calculated in block 1830. A technique for calculating the shift kernels from the motion vector involves using a kronecker-delta kernel that is shifted according to the motion vectors calculated earlier. The shift kernels are provided to the digital auto focus block 111 in the preview/video mode ISP 1850, wherein frame (n) is processed based on the shift kernel and other kernels. The other kernels may be used for sharpening. In various embodiments, the alpha, beta, and/or gamma parameters are used to modify the strength of the effect of processing with the other kernels, as described herein.

6.4 Combining the Sharpening and Motion Blur Kernels

As mentioned herein, the sharpening algorithm may use a certain support size for its kernels that may be implementation-dependent. For example, the kernel may provide a 9×9 pixel support. However, using the anti-motion-blur along with the sharpening algorithm should not necessarily increase the kernel size. Conventionally, when convolving two kernels—if one is of size M×M and the other N×N, their convolution is (M+N−1)×(M+N−1). In order to maintain kernel size, it is possible to alter the shape of the sharpening kernel to more closely resemble and complement the motion blur kernel. Also, note that the motion de-blurring kernels might have asymmetric shapes. For instance, the de-blur kernels may include rectangle, diagonal, and even circular supports, and not necessarily a square support. This asymmetry provides compensation for not only "simple" shaking-paths (such as lines), but also more complex ones (such as a cross, T, or circular paths).

7.0 Hardware Overview

7.1 Example Mobile Device

Figure 13:
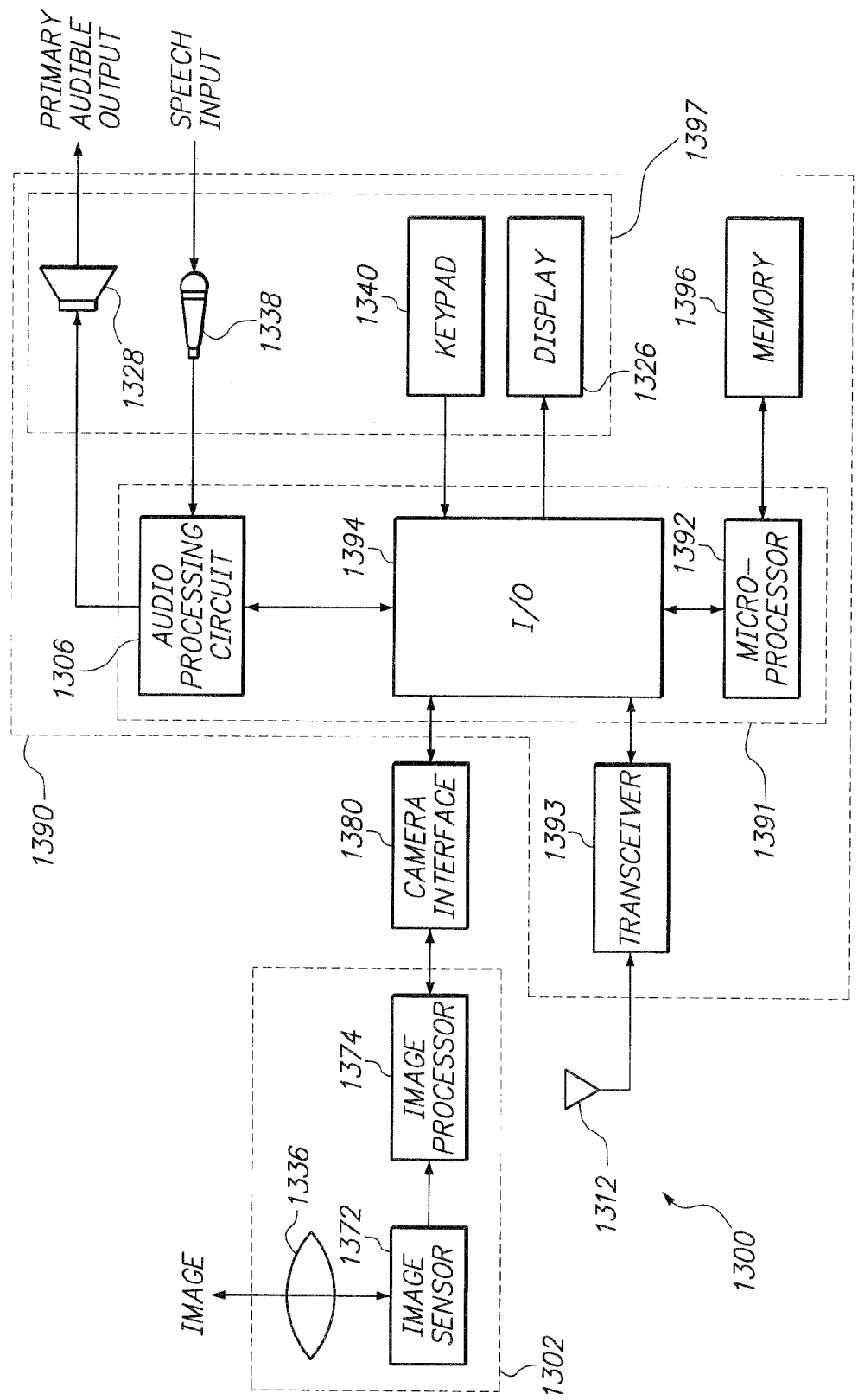
FIG. 13 is a diagram of an example mobile device upon which embodiments of the present invention may be practiced.

FIG. 13 illustrates a block diagram for an example mobile device 1300 in which embodiments of the present invention may be implemented. Mobile device 1300 comprises a camera assembly 1302, camera and graphics interface 1380, and a communication circuit 1390. Camera assembly 1370 includes camera lens 1336, image sensor 1372, and image processor 1374. Camera lens 1336, comprising a single lens or a plurality of lenses, collects and focuses light onto image sensor 1372. Image sensor 1372 captures images formed by light collected and focused by camera lens 1336. Image sensor 1372 may be any conventional image sensor 1372, such as a charge-coupled device (CCD) or a complementary metal oxide semiconductor (CMOS) image sensor. Image processor 1374 processes raw image data captured by image sensor 1372 for subsequent storage in memory 1396, output to a display 1326, and/or for transmission by communication circuit 1390. The image processor 1374 may be a conventional digital signal processor programmed to process image data, which is well known in the art.

Image processor 1374 interfaces with communication circuit 1390 via camera and graphics interface 1380. Communication circuit 1390 comprises antenna 1392, transceiver 1394, memory 1396, microprocessor 1392, input/output circuit 1394, audio processing circuit 1396, and user interface 1397. Transceiver 1394 is coupled to antenna 1392 for receiving and transmitting signals. Transceiver 1392 is a fully functional cellular radio transceiver, which may operate according to any known standard, including the standards known generally as the Global System for Mobile Communications (GSM), TIA/EIA-136, cdmaOne, cdma2000, UMTS, and Wideband CDMA.

The image processor 1374 may process images acquired by the sensor 1372 using one or more embodiments described herein. The image processor 1374 can be implemented in hardware, software, or some combination of software and hardware. For example, the image processor 1374 could be implemented as part of an application specific integrated circuit (ASIC). As another example, the image processor 1374 may be capable of accessing instructions that are stored on a computer readable medium and executing those instructions on a processor, in order to implement one or more embodiments of the present invention.

Microprocessor 1392 controls the operation of mobile device 1300, including transceiver 1394, according to programs stored in memory 1396. Microprocessor 1392 may further execute portions or the entirety of the image processing embodiments disclosed herein. Processing functions may be implemented in a single microprocessor, or in multiple microprocessors. Suitable microprocessors may include, for example, both general purpose and special purpose microprocessors and digital signal processors. Memory 1396 represents the entire hierarchy of memory in a mobile communication device, and may include both random access memory (RAM) and read-only memory (ROM). Computer program instructions and data required for operation are stored in non-volatile memory, such as EPROM, EEPROM, and/or flash memory, which may be implemented as discrete devices, stacked devices, or integrated with microprocessor 1392.

Input/output circuit 1394 interfaces microprocessor 1392 with image processor 1374 of camera assembly 1370 via camera and graphics interface 1380. Camera and graphics interface 1380 may also interface image processor 1374 with user interface 1397 according to any method known in the art. In addition, input/output circuit 1394 interfaces microprocessor 1392, transceiver 1394, audio processing circuit 1396, and user interface 1397 of communication circuit 1390. User interface 1397 includes a display 1326, speaker 1328, microphone 1338, and keypad 1340. Display 1326, disposed on the back of display section, allows the operator to see dialed digits, images, called status, menu options, and other service information. Keypad 1340 includes an alphanumeric keypad and may optionally include a navigation control, such as joystick control (not shown) as is well known in the art. Further, keypad 1340 may comprise a full QWERTY keyboard, such as those used with palmtop computers or smart phones. Keypad 1340 allows the operator to dial numbers, enter commands, and select options.

Microphone 1338 converts the user's speech into electrical audio signals. Audio processing circuit 1396 accepts the analog audio inputs from microphone 1338, processes these signals, and provides the processed signals to transceiver 1394 via input/output 1394. Audio signals received by transceiver 1394 are processed by audio processing circuit 1396. The basic analog output signals produced by processed audio processing circuit 1396 are provided to speaker 1328. Speaker 1328 then converts the analog audio signals into audible signals that can be heard by the user.

Those skilled in the art will appreciate that one or more elements shown in FIG. 13 may be combined. For example, while the camera and graphics interface 1380 is shown as a separated component in FIG. 13, it will be understood that camera and graphics interface 1380 may be incorporated with input/output circuit 1394. Further, microprocessor 1392, input/output circuit 1394, audio processing circuit 1396, image processor 1374, and/or memory 1396 may be incorporated into a specially designed application-specific integrated circuit (ASIC) 1391.

7.2 Example Computer System

Figure 14:
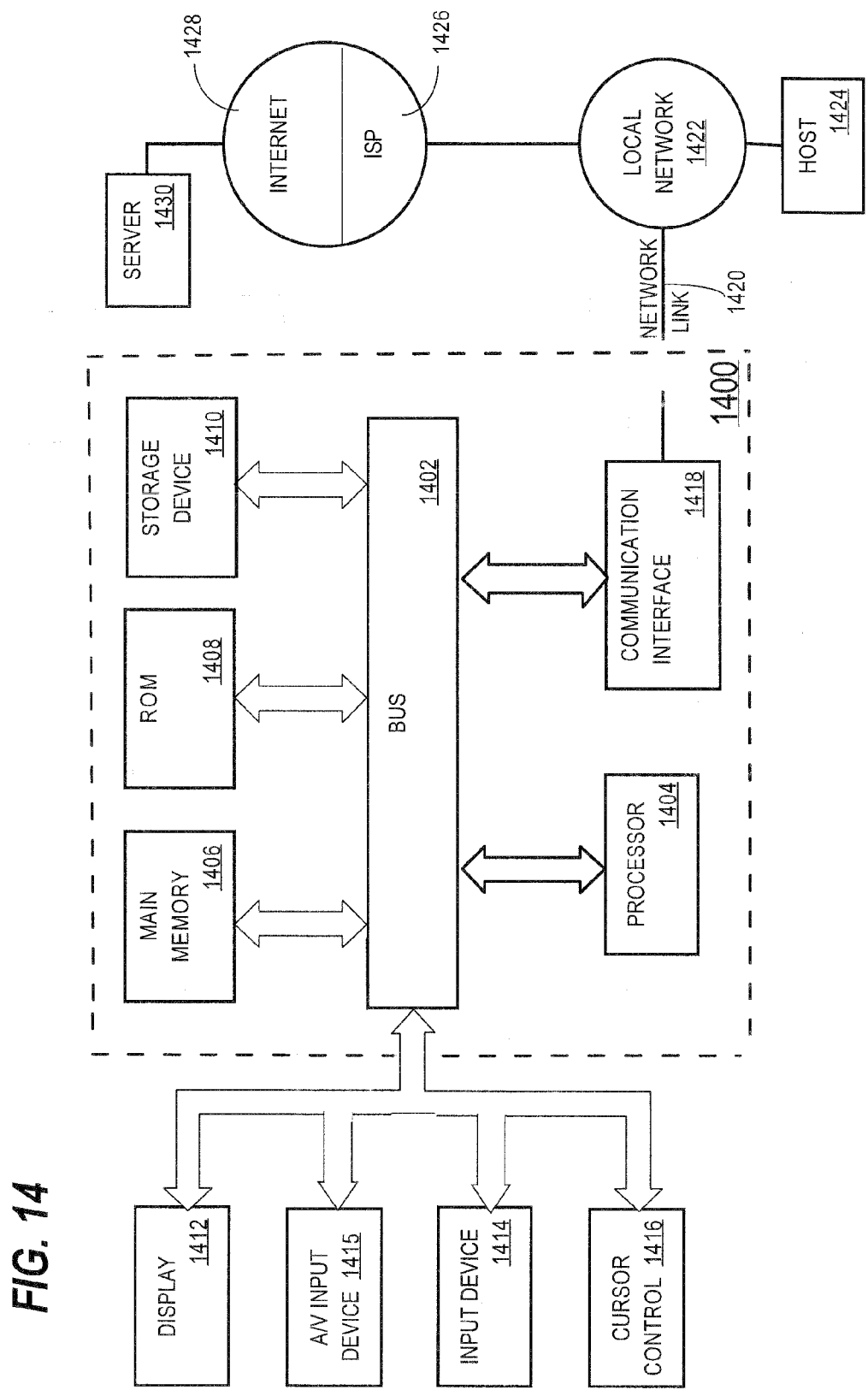
FIG. 14 is a diagram of an example computer system upon which embodiments of the present invention may be practiced.

FIG. 14 is a block diagram that illustrates a computer system 1400 upon which one or more embodiments of the invention may be implemented. Computer system 1400 includes a bus 1402 or other communication mechanism for communicating information, and a processor 1404 coupled with bus 1402 for processing information. Computer system 1400 also includes a main memory 1406, such as a random access memory (RAM) or other dynamic storage device, coupled to bus 1402 for storing information and instructions to be executed by processor 1404. Main memory 1406 also may be used for storing temporary variables or other intermediate information during execution of instructions to be executed by processor 1404. Computer system 1400 further includes a read only memory (ROM) 1408 or other static storage device coupled to bus 1402 for storing static information and instructions for processor 1404. A storage device 1410, such as a magnetic disk or optical disk, is provided and coupled to bus 1402 for storing information and instructions.

Computer system 1400 may be coupled via bus 1402 to a display 1412, such as a cathode ray tube (CRT), for displaying information to a computer user. An input device 1414, including alphanumeric and other keys, is coupled to bus 1402 for communicating information and command selections to processor 1404. Another type of user input device is cursor control 1416, such as a mouse, a trackball, or cursor direction keys for communicating direction information and command selections to processor 1404 and for controlling cursor movement on display 1412. This input device typically has two degrees of freedom in two axes, a first axis (e.g., x) and a second axis (e.g., y), that allows the device to specify positions in a plane. The computer system 1400 may further include an audio/video input device 1415 such as a microphone or camera to supply audible sounds, still images, or motion video, any of which may be processed using the embodiments described above.

Various processing techniques disclosed herein may be implemented to process data on a computer system 1400. According to one embodiment of the invention, those techniques are performed by computer system 1400 in response to processor 1404 executing one or more sequences of one or more instructions contained in main memory 1406. Such instructions may be read into main memory 1406 from another machine-readable medium, such as storage device 1410. Execution of the sequences of instructions contained in main memory 1406 causes processor 1404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 1400, various machine-readable media are involved, for example, in providing instructions to processor 1404 for execution. Such a medium may take many forms, including but not limited to storage media and transmission media. Storage media includes both non-volatile media and volatile media. Non-volatile media includes, for example, optical or magnetic disks, such as storage device 1410. Volatile media includes dynamic memory, such as main memory 1406. Transmission media includes coaxial cables, copper wire and fiber optics, including the wires that comprise bus 1402. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 1404 for execution. For example, the instructions may initially be carried on a magnetic disk of a remote computer. The remote computer can load the instructions into its dynamic memory and send the instructions over a telephone line using a modem. A modem local to computer system 1400 can receive the data on the telephone line and use an infra-red transmitter to convert the data to an infra-red signal. An infra-red detector can receive the data carried in the infra-red signal and appropriate circuitry can place the data on bus 1402. Bus 1402 carries the data to main memory 1406, from which processor 1404 retrieves and executes the instructions.

The instructions received by main memory 1406 may optionally be stored on storage device 1410 either before or after execution by processor 1404.

Computer system 1400 also includes a communication interface 1418 coupled to bus 1402. Communication interface 1418 provides a two-way data communication coupling to a network link 1420 that is connected to a local network 1422. For example, communication interface 1418 may be an integrated services digital network (ISDN) card or a modem to provide a data communication connection to a corresponding type of telephone line. As another example, communication interface 1418 may be a local area network (LAN) card to provide a data communication connection to a compatible LAN. Wireless links may also be implemented. In any such implementation, communication interface 1418 sends and receives electrical, electromagnetic or optical signals that carry digital data streams representing various types of information.

Network link 1420 typically provides data communication through one or more networks to other data devices. For example, network link 1420 may provide a connection through local network 1422 to a host computer 1424 or to data equipment operated by an Internet Service Provider (ISP) 1426. ISP 1426 in turn provides data communication services through the world wide packet data communication network now commonly referred to as the "Internet" 1428. Local network 1422 and Internet 1428 both use electrical, electromagnetic or optical signals that carry digital data streams. The signals through the various networks and the signals on network link 1420 and through communication interface 1418, which carry the digital data to and from computer system 1400, are example forms of carrier waves transporting the information.

Computer system 1400 can send messages and receive data, including program code, through the network(s), network link 1420 and communication interface 1418. In the Internet example, a server 1430 might transmit a requested code for an application program through Internet 1428, ISP 1426, local network 1422 and communication interface 1418.

The received code may be executed by processor 1404 as it is received, and/or stored in storage device 1410, or other non-volatile storage for later execution. In this manner, computer system 1400 may obtain application code in the form of a carrier wave.

Data that is processed by the embodiments of program code as described herein may be obtained from a variety of sources, including but not limited to an A/V input device 1415, storage device 1410, and communication interface 1418.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
    receiving a signal matrix comprising a plurality of pixel values corresponding to a portion of a captured image;
    accessing a pre-constructed kernel matrix from storage that, when applied to the signal matrix, produces an effect of a certain magnitude;
    calculating one or more metrics based at least partially upon one or more parameters pertaining to the signal matrix; and
    based at least partially upon the one or more metrics, adjusting the effect of applying the kernel matrix to the signal matrix from the certain magnitude to an intended magnitude.

2. The method of claim 1, wherein adjusting the effect of applying the kernel matrix to the signal matrix from the certain magnitude to an intended magnitude includes:
    modifying the kernel matrix, based at least partially upon the one or more metrics, to generate a modified kernel matrix for the signal matrix; and
    applying the modified kernel matrix to the signal matrix to achieve an effect of the intended magnitude.

3. The method of claim 1, wherein adjusting the effect of applying the kernel matrix to the signal matrix from the certain magnitude to an intended magnitude includes:
    applying the kernel matrix to the signal matrix to derive an intermediate result having an effect of the certain magnitude; and
    scaling, based at least partially upon the one or more metrics, the intermediate result to adjust the effect from the certain magnitude to the intended magnitude.

4. The method of claim 1, wherein the effect of applying the kernel matrix to the signal matrix includes enhancing image contrast in the portion of the captured image corresponding to the signal matrix.

5. The method of claim 1, wherein the effect of applying the kernel matrix to the signal matrix includes de-noising the portion of the captured image corresponding to the signal matrix.

6. The method of claim 1, wherein calculating one or more metrics based at least partially upon one or more parameters pertaining to the signal matrix comprises:
    calculating a first metric based upon a noise parameter of the signal matrix, wherein the noise parameter indicates how much noise is present in the portion of the captured image corresponding to the signal matrix.

7. The method of claim 1, wherein calculating one or more metrics based at least partially upon one or more parameters pertaining to the signal matrix comprises:
    calculating a first metric based upon properties of a lens that is used to capture the captured image.

8. The method of claim 1, wherein calculating one or more metrics based at least partially upon one or more parameters pertaining to the signal matrix comprises:
    calculating a first metric based upon at least a subset of the pixel values in the signal matrix, including a current pixel value being processed and one or more neighboring pixel values.

9. The method of claim 1, wherein calculating one or more metrics based at least partially upon one or more parameters pertaining to the signal matrix comprises:
    calculating a first metric based upon a spatial location parameter of the signal matrix, wherein the spatial location parameter indicates where, in the captured image, the portion of the captured image corresponding to the signal matrix is located.

10. The method of claim 1, further comprising, prior to applying the kernel matrix to the signal matrix, modifying the kernel matrix based on a motion blur characteristic of the captured image.

11. An image processing apparatus comprising:
a lens;
an image capture device that is optically coupled to the lens, wherein the image capture device captures an image; and
an image processor configured to perform the following operations:
receiving, from the image capture device, a signal matrix comprising a plurality of pixel values corresponding to a portion of the captured image;
accessing a pre-constructed kernel matrix from storage that, when applied to the signal matrix, produces an effect of a certain magnitude;
calculating one or more metrics based at least partially upon one or more parameters pertaining to the signal matrix; and
based at least partially upon the one or more metrics, adjusting the effect of applying the kernel matrix to the signal matrix from the certain magnitude to an intended magnitude.

12. The image processing apparatus of claim 11, wherein the image processor adjusts the effect of applying the kernel matrix to the signal matrix by:
modifying the kernel matrix, based at least partially upon the one or more metrics, to generate a modified kernel matrix for the signal matrix; and
applying the modified kernel matrix to the signal matrix to achieve an effect of the intended magnitude.

13. The image processing apparatus of claim 11, wherein the image processor adjusts the effect of applying the kernel matrix to the signal matrix by:
applying the kernel matrix to the signal matrix to derive an intermediate result having an effect of the certain magnitude; and
scaling, based at least partially upon the one or more metrics, the intermediate result to adjust the effect from the certain magnitude to the intended magnitude.

14. The image processing apparatus of claim 11, wherein the effect of applying the kernel matrix to the signal matrix includes enhancing image contrast in the portion of the captured image corresponding to the signal matrix.

15. The image processing apparatus of claim 11, wherein the effect of applying the kernel matrix to the signal matrix includes de-noising the portion of the captured image corresponding to the signal matrix.

16. The image processing apparatus of claim 11, wherein calculating one or more metrics based at least partially upon one or more parameters pertaining to the signal matrix comprises:
calculating a first metric based upon a noise parameter of the signal matrix, wherein the noise parameter indicates how much noise is present in the portion of the captured image corresponding to the signal matrix.

17. The image processing apparatus of claim 16, wherein calculating one or more metrics based at least partially upon one or more parameters pertaining to the signal matrix further comprises:
calculating a second metric based upon properties of the lens.

18. The image processing apparatus of claim 17, wherein calculating one or more metrics based at least partially upon one or more parameters pertaining to the signal matrix further comprises:
calculating a third metric based upon at least a subset of the pixel values in the signal matrix, including a current pixel value being processed and one or more neighboring pixel values.

19. The image processing apparatus of claim 16, wherein calculating one or more metrics based at least partially upon one or more parameters pertaining to the signal matrix further comprises:
calculating a second metric based upon at least a subset of the pixel values in the signal matrix, including a current pixel value being processed and one or more neighboring pixel values.

20. The image processing apparatus of claim 19, wherein the effect of applying the kernel matrix to the signal matrix is adjusted based at least partially upon the first metric and the second metric.

21. The image processing apparatus of claim 17, wherein the effect of applying the kernel matrix to the signal matrix is adjusted based at least partially upon the first metric and the second metric.

22. The image processing apparatus of claim 18, wherein the effect of applying the kernel matrix to the signal matrix is adjusted based at least partially upon the first metric, the second metric, and the third metric.

23. The image processing apparatus of claim 11, wherein calculating one or more metrics based at least partially upon one or more parameters pertaining to the signal matrix comprises:
calculating a first metric based upon properties of the lens.

24. The image processing apparatus of claim 11, wherein calculating one or more metrics based at least partially upon one or more parameters pertaining to the signal matrix comprises:
calculating a first metric based upon at least a subset of the pixel values in the signal matrix, including a current pixel value being processed and one or more neighboring pixel values.

25. The image processing apparatus of claim 24, wherein the first metric is calculated based at least partially upon differences in pixel values between various pixel values in the subset of pixel values.

26. The image processing apparatus of claim 24, wherein the first metric is calculated based at least partially upon a standard deviation in pixel values in the subset of pixel values.

27. The image processing apparatus of claim 24, wherein the first metric is calculated based at least partially upon a histogram of the pixel values in the subset of pixel values.

28. The image processing apparatus of claim 24, wherein the first metric is calculated, at least partially, by applying an edge detection mask to the pixel values in the subset of pixel values.

29. The image processing apparatus of claim 24, wherein the first metric is calculated based at least partially upon entropy of pixel values in the subset of pixel values.

30. The image processing apparatus of claim 11, wherein the image processor, prior to applying the kernel matrix to the signal matrix, modifies the kernel matrix based on a motion blur characteristic of the captured image.

31. A method comprising:
receiving a signal matrix comprising a plurality of pixel values corresponding to a portion of a captured image;
accessing a kernel matrix that, when applied to the signal matrix, produces an effect of a certain magnitude, wherein the effect includes sharpening the portion of the captured image corresponding to the signal matrix;
calculating one or more metrics based at least partially upon one or more parameters pertaining to the signal matrix, wherein the one or more metrics includes a first metric that is calculated based upon a noise parameter of the signal matrix, wherein the first metric indicates how much noise is present in the captured image; and based at least partially upon the one or more metrics, adjusting the effect of applying the kernel matrix to the signal matrix from the certain magnitude to an intended magnitude, wherein adjusting the effect comprises adjusting the effect based at least partially upon the first metric such that the more noise there is in the captured image, the less sharpening is performed on the portion of the captured image corresponding to the signal matrix.

32. A method comprising:

receiving a signal matrix comprising a plurality of pixel values corresponding to a portion of a captured image;

accessing a kernel matrix that, when applied to the signal matrix, produces an effect of a certain magnitude, wherein the effect includes sharpening the portion of the captured image corresponding to the signal matrix;

calculating one or more metrics based at least partially upon one or more parameters pertaining to the signal matrix, wherein the one or more metrics includes a first metric that is calculated based upon a distance R between the portion of the captured image corresponding to the signal matrix and a lens center of the capture image; and based at least partially upon the one or more metrics, adjusting the effect of applying the kernel matrix to the signal matrix from the certain magnitude to an intended magnitude, wherein adjusting the effect comprises adjusting the effect based at least partially upon the first metric such that the greater the distance R between the portion of the captured image corresponding to the signal matrix and the lens center of the captured image, the less sharpening is performed on the portion of the captured image corresponding to the signal matrix.

33. An image processing apparatus, comprising:

a lens;

an image capture device that is optically coupled to the lens, wherein the image capture device captures an image; and an image processor configured to perform the following operations:

receiving, from the image capture device, a signal matrix comprising a plurality of pixel values corresponding to a portion of the captured image;

accessing a kernel matrix that, when applied to the signal matrix, produces an effect of a certain magnitude, wherein the effect includes sharpening the portion of the captured image corresponding to the signal matrix;

calculating one or more metrics based at least partially upon one or more parameters pertaining to the signal matrix, wherein the one or more metrics includes a first metric that is calculated based upon a noise parameter of the signal matrix, wherein the first metric indicates how much noise is present in the captured image; and based at least partially upon the one or more metrics, adjusting the effect of applying the kernel matrix to the signal matrix from the certain magnitude to an intended magnitude, wherein adjusting the effect comprises adjusting the effect based at least partially upon the first metric such that the more noise there is in the captured image, the less sharpening is performed on the portion of the captured image corresponding to the signal matrix.

34. An image processing apparatus, comprising:

a lens;

an image capture device that is optically coupled to the lens, wherein the image capture device captures an image; and an image processor configured to perform the following operations:

receiving, from the image capture device, a signal matrix comprising a plurality of pixel values corresponding to a portion of the captured image;

accessing a kernel matrix that, when applied to the signal matrix, produces an effect of a certain magnitude, wherein the effect includes sharpening the portion of the captured image corresponding to the signal matrix;

calculating one or more metrics based at least partially upon one or more parameters pertaining to the signal matrix, wherein the one or more metrics includes a first metric that is calculated based upon a distance R between the portion of the captured image corresponding to the signal matrix and a lens center of the captured image; and based at least partially upon the one or more metrics, adjusting the effect of applying the kernel matrix to the signal matrix from the certain magnitude to an intended magnitude, wherein adjusting the effect comprises adjusting the effect based at least partially upon the first metric such that the greater the distance R between the portion of the captured image corresponding to the signal matrix and the lens center of the captured image, the less sharpening is performed on the portion of the captured image corresponding to the signal matrix.

\* \* \* \* \*